(12) United States Patent
Yamashita et al.

(10) Patent No.: US 7,004,610 B2
(45) Date of Patent: Feb. 28, 2006

(54) LIGHT SOURCE DEVICE

(75) Inventors: Tomoyoshi Yamashita, Kanagawa (JP); Yasuko Hayashi, Kanagawa (JP)

(73) Assignee: Mitsubishi Rayon Co., Ltd., Tokyo (JP)

(*) Notice: Subject to any disclaimer, the term of this patent is extended or adjusted under 35 U.S.C. 154(b) by 249 days.

(21) Appl. No.: 10/381,257

(22) PCT Filed: Sep. 25, 2001

(86) PCT No.: PCT/JP01/08299

§ 371 (c)(1),
(2), (4) Date: Mar. 24, 2003

(87) PCT Pub. No.: WO02/25167

PCT Pub. Date: Mar. 28, 2002

(65) Prior Publication Data

US 2004/0022050 A1 Feb. 5, 2004

(30) Foreign Application Priority Data

Sep. 25, 2000 (JP) ............................. 2000-290746
Nov. 8, 2000 (JP) ............................. 2000-340905
Nov. 24, 2000 (JP) ............................. 2000-357680

(51) Int. Cl.
*F21V 7/04* (2006.01)

(52) U.S. Cl. ........................ 362/606; 362/26; 362/308; 362/326; 362/330

(58) Field of Classification Search .................. 362/31, 362/27, 26, 308, 326, 328, 329, 299, 337, 362/336, 330, 582, 606; 349/61, 64; 385/146, 385/901; 359/559, 831
See application file for complete search history.

(56) References Cited

U.S. PATENT DOCUMENTS 6,731,355 B1 * 5/2004 Miyashita .................... 349/65
6,742,921 B1 * 6/2004 Umemoto et al. .......... 362/561

FOREIGN PATENT DOCUMENTS

| JP | 64-24522 A | 1/1989 |
|----|------------|--------|
| JP | 1-107406 | 4/1989 |
| JP | 1-244490 | 9/1989 |
| JP | 1-252933 | 10/1989 |
| JP | 2-84618 | 3/1990 |
| JP | 5-88174 | 4/1993 |
| JP | 5-333334 | 12/1993 |

(Continued)

*Primary Examiner*—John Anthony Ward
*Assistant Examiner*—Bertrand Zeade
(74) *Attorney, Agent, or Firm*—Morgan, Lewis & Bockius LLP

(57) ABSTRACT

The index of refraction of a light guide (6) for transmitting light outputted from a primary light source (1) is ng, and the light guide (6) has a light input end face (9), a light output surface from which the transmitted light is outputted, and a back surface opposed to the light output surface. A leaky ray modulator (8) is provided to at least either the light output surface or the back surface. The leaky ray modulator (8) has a composite layer (50) provided on the light output surface or the back surface and composed of first refractive index regions (3) having a refractive index n1 (ng>n1) and second refractive index regions (4) having a refractive index n2 (n2>n1) and a third refractive index layer (5) provided on the composite layer (50) and having a refractive index n3 (n3>n1). A reflecting plate (7) is provided adjacent to the back surface of the light guide (6).

36 Claims, 11 Drawing Sheets

FOREIGN PATENT DOCUMENTS

| | | |
|---|---|---|
| JP | 6-235917 | 8/1994 |
| JP | 7-171228 | 7/1995 |
| JP | 7-270624 | 10/1995 |
| JP | 7-320514 | 12/1995 |
| JP | 8-18429 | 1/1996 |
| JP | 8-32120 | 2/1996 |
| JP | 8-40719 | 2/1996 |
| JP | 10-48428 | 2/1998 |
| JP | 10-96924 | 4/1998 |
| JP | 10-511803 | 11/1998 |
| JP | 11-329039 | 11/1999 |
| JP | 2000-100231 | 4/2000 |
| JP | 2000-121837 | 4/2000 |
| JP | 2000-250032 | 9/2000 |
| JP | 2001-133776 | 5/2001 |
| WO | WO 98/19105 | 5/1998 |

* cited by examiner

LIGHT SOURCE DEVICE

TECHNICAL FIELD

The present invention relates to a light source device such as (1) a surface light source device or planar light source device used for a liquid crystal display device used for a notebook computer, a liquid crystal television or the like, and an indication device for guide sign boards and large billboards at stations and public facilities, and traffic guide boards, traffic signs or the like on highways or general roads, (2) a surface light source device or planar light source device using a point light source such as an LED, which is used for a relatively compact liquid crystal display device or the like used for a portable telephone (cellular phone) or a portable information terminal (personal digital assistant [PDA]), and (3) a linear light source device or bar-like light source device for converting a light source of the LED or the like into a uniform linear light source. More specifically, the invention relates to a light source such as a surface light source device or a linear light source device designed to obtain high luminance and a uniform luminance distribution in a light output surface or light emission surface.

BACKGROUND ART

A thin and uniform light source device low in power consumption and high in luminance must be disposed for a light source device for a liquid crystal display device or the like used for a portable information terminal, a notebook computer, a liquid crystal television or the like. Especially, in a portable electronic device such as potable telephone or a portable information terminal having a relatively compact liquid crystal display device, such a requirement is stronger.

Conventionally, as a system of a back surface light source device used for a liquid crystal display device, a billboard, a traffic guide board or the like, there are a direct-under lighting system including a plurality of linear light sources such as fluorescent lamps installed in a housing, and an edge lighting system including a line light source arranged in a side end face of a plate-like light guide. The back surface light source device of the direct-under lighting system has had a difficulty of weight-reducing or thinning of a light source portion, and a problem of easy occurrence of a see-through phenomenon where the fluorescent lamp or the like used as a primary light source is seen through from a sign board. As a light and thin back surface light source device, the edge lighting system has frequently been used. In recent years, there has also been an increase in demand for a mobile electronic device such as a portable telephone, an electronic notebook, or a game machine. Thus, there is a desire for development of a thin back surface light source device having high luminance and good uniformity of a luminance distribution to be used as the light source portion for a display unit of such a device.

In the case of the back surface light source device of the edge lighting system, normally, the light guide is made of a plate-like transparent material such as an acrylic resin plate, a light from a primary light source (may be simply referred to as "light source", hereinafter) arranged to face its side end face is made incident on the light guide from the side end face (light input surface or light incident face), and the incident light is outputted or emitted from a light output surface or light emitting surface by providing a light output or emission function unit such as a light scattering or diffusing surface or the like formed in a front surface (light output surface) of the light guide or a back surface opposite the front surface. However, in the device including the light output function unit uniformly formed in the front surface or the back surface of the light guide, luminance of the outputted light is reduced as it is more apart from the light source. Consequently, luminance in the light output surface becomes non-uniform, making it impossible to obtain a good display screen. Such a tendency becomes conspicuous as the surface light source device is enlarged, and cannot endure practical use in a surface light source device of 10 inches or more. Especially, in the case of the liquid crystal display device used for a notebook computer, a liquid crystal television or the like, very high uniformity of a luminance distribution in its screen is required.

Various presentations have been made in order to solve the problem of the non-uniform luminance of the surface light source device. For example, JP(A)-1-24522 presents a surface light source device including a light output function unit in a back surface opposite a light output surface of a light guide, on which a light diffusion material is applied or deposited densely as it is more apart from a light input surface. JP(A)-1-107406 presents a surface light source device which uses a light guide obtained by laminating a plurality of transparent plates each having small spots made of light scattering materials formed in various patterns on a surface. In such surface light source devices, there is a drawback that use of a white pigment of titanium oxide, barium sulfate or the like as a light scattering material causes a light loss such as light absorption when a light incident on the light scattering material is scattered, leading to a reduction in luminance of an outputted light in a desired direction.

Each of JP(A)-1-244490 and JP(A)-1-252933 presents a surface light source device which includes an outputted or emitted light adjustment member or a light diffusion plate having a light reflection pattern matching a distribution of an inverse number of outputted light luminance on a light output surface of a light guide. In such surface light source devices, however, there is also a drawback that impossibility of reuse of a light reflected by the outputted light adjustment member or the light diffusion plate causes a light loss, leading to a reduction in luminance of an outputted light in a desired direction.

Further, JP(A)-2-84618 presents a surface light source device which includes a linear light source arranged so as to face a light input surface of a light guide, at least one of a light output surface and a back surface of the light guide being set as a mat finished surface, and a prism sheet placed on the light output surface. Such a surface light source device can obtain very high luminance, but it is not satisfactory in uniformity of luminance in the light output surface. Also, the mat finished surface is subtly controlled to somehow increase a uniformity ratio of luminance. However, there is still a problem in subtle reproducibility of the mat finished surface configuration. Additionally, in such a surface light source device, because a distribution of an outputted light (distribution in directions vertical and parallel to light input surface) is too wide (especially in the direction parallel to light input surface), as a surface light source device used for a portable electronic device, requirements of low power consumption and high luminance cannot be satisfied.

On the other hand, as a surface light source device for making uniform luminance of an outputted light and increasing luminance by reducing a light loss, there is a disclosure in JP(A)-8-40719. A light guide for a surface light source device according to the disclosed technology is characterized in that at least one side end face of a plate-like transparent body is set as a light input surface, a surface substantially orthogonal thereto is set as a light output surface, at least one of the light output surface and its back surface is constituted of many substantially spherical minute convex bodies, a ratio of a minute average curvature radius and an average period of a lens group of the convex bodies is 3 to 10, and a ratio of an average deviation of a distribution of the minute average curvature radius and the minute average curvature radius is 0.8 or lower. However, as the light guide is made thinner and a ratio of a length to its thickness is made larger, it is difficult to obtain uniform output characteristics of a light in the light output surface only by a structure where the surface is constituted of many substantially spherical minute convex bodies.

Additionally, in JP(A)-7-171228, there has been presented a technology for obtaining a surface light source having a narrow distribution of outputted light rays of a backlight and high light output normal luminance of a peak light by forming a special saw-tooth prism structure in a light guide (technology of output light control structure). This method is very effective means capable of realizing very high normal luminance in a narrow visual field only by the light guide without using any prism sheets. On the other hand, a uniformity ratio of an outputted light luminance distribution tends to be lost greatly. As in the case of this method, it is very difficult to obtain a high uniformity ratio of luminance based on formation of many micro concave and convex portions by a mat finished surface or other dot patterns, a distribution of shapes thereof or the like to add a special function to the light guide itself. Thus, it has been a great technical problem to simultaneously obtain a high uniformity ratio without losing the special functionality added to the light guide itself.

Furthermore, in the prism structure, a light traveling in a direction vertical to a direction of an elongated prism is directed to the normal direction of the light output surface. However, since a light traveling in a direction oblique to the elongated prism cannot be directed to the normal direction of the light output surface, the amount of this light becomes a loss. Thus, especially the surface light source device using the point light source has had a problem in terms of light use efficiency. As a light source for such a surface light source device, a compact LED light source low in power consumption has been used. Examples are a surface light source device using a direct-under lighting LED light source, which is similar to that described in JP(A)-8-32120, a surface light source device including an LED light source disposed on a light guide end face and a V-shaped groove formed on the light guide in a light traveling direction, which is similar to that described in JP(A)-7-270624, a surface light source device including an LED light source disposed on a light guide end face and a roughened light guide surface, which is similar to that described in JP(A)-8-18429, and a surface light source device including an LED light source disposed at a light guide corner and using a scattering light guide having a light diffusion material dispersed inside, which is similar to that described in JP(A)-7-320514. In these surface light source devices, however, there is a problem that because of a wide distribution of an outputted light, luminance per power consumption cannot be sufficiently increased and, because of a spot shape of a light source, only a portion before the light source is bright, causing uneven luminance as a whole. Additionally, JP(A)-11-329039 presents a surface light source device where triangular convex shape portions are arranged in a back surface of a light guide concentrically to a point light source and discretely with each other. However, in such a surface light source device, there is a problem that because of the discrete arrangement of the triangular convex shape portions, a light propagated through the light guide cannot be efficiently outputted in the normal direction of a light output surface.

An object of the present invention is to provide a light source device such as a surface light source device or a linear light source device capable of setting a luminance uniformity ratio of an outputted light very high in a light output surface even if the device is relatively thin and large in area.

Another object of the present invention is to provide a light source device such as a surface light source device or a linear light source device capable of obtaining a very high uniformity ratio of an outputted light in a light output surface without losing functionality even in the case of using a light guide having the special functionality regarding an outputted light control function.

Still another object of the present invention is to provide a thin and uniform surface light source device low in power consumption and high in luminance, which uses a point light source such as an LED and which is suitable especially for a portable electronic device such as a portable telephone or a portable information terminal.

SUMMARY OF THE INVENTION

In order to attain the above objects, according to the present invention, there is provided a light source device comprising:

a primary light source;

a light guide constituting a waveguide for transmitting a light outputted from the primary light source, having a refractive index of ng, and including a light input end face on which a light emitted from the primary light source is made incident, a light output surface for outputting a transmitted light, and a back surface positioned in a side opposite the light output surface; and a light leakage modulator or leaky ray modulator attached to at least one of the light output surface and the back surface of the light guide, and including a composite layer positioned on the light output surface or the back surface and having a plurality of first refractive index regions each having a refractive index of n1 (here, ng>n1) and a plurality of second refractive index regions each having a refractive index of n2 (here, n2>n1), and a third refractive index layer positioned on the composite layer and having a refractive index of n3 (here, n3>n1).

In an aspect of the present invention, a fourth refractive index layer having a refractive index of n4 (here, ng>n4>n1) is disposed between the light guide and the light leakage modulator. In an aspect of the present invention, a density of the second refractive index regions indicated by an area occupied by the second refractive index regions per unit area of the composite layer is changed from place to place in a surface of the composite layer.

In an aspect of the present invention, a thickness H1 of the first refractive index regions and a thickness H2 of the second refractive index regions are both within a range of 5 $\mu$m to 200 $\mu$m. In an aspect of the present invention, an average thickness H1 of the first refractive index regions and an average minimum dimension W2 in an in-plane direction of the second refractive index regions satisfy a relationship of 123 (W2/H1))$\leqq$30.

In an aspect of the present invention, n2<ng is set. In an aspect of the present invention, n2$\geqq$n3$\geqq$ng or n3$\geqq$n2$\geqq$ng is set. In an aspect of the present invention, n2$\geqq$ng$\geqq$n3 or ng$\geqq$n2$\geqq$n3 is set. In an aspect of the present invention, n3$\geqq$ng$\geqq$n2 or ng$\geqq$n3$\geqq$n2 is set.

In an aspect of the present invention, the first refractive index regions are made of air. In an aspect of the present invention, at least one of the second refractive index regions and the third refractive index layer is made of an ultraviolet curable resin composition.

In an aspect of the present invention, the first refractive index regions and the second refractive index regions of the light leakage modulator are each shaped in stripe and alternately arrayed. In an aspect of the present invention, the first refractive index regions and the second refractive index regions of the light leakage modulator are irregularly arrayed.

In an aspect of the present invention, the third refractive index layer or the composite layer has a light control function, and the light control function is at least one of a directional light output function or a light diffusion function.

In an aspect of the present invention, in the third refractive index layer of the light leakage modulator attached to the back surface of the light guide or in a member arranged on the third refractive index layer, a directional light output function unit is formed by arraying many elongated prisms each including two prism surfaces in a direction substantially vertical to a propagation direction of a light in the light guide in parallel with one another. In an aspect of the present invention, each of the elongated prisms has a flat portion in a tip between the two prism surfaces. In an aspect of the present invention, a flat portion is formed in a valley between adjacent elongated prisms. In an aspect of the present invention, each of the elongated prisms are formed in arc shape.

In an aspect of the present invention, inclination of a prism surface of the elongated prisms near the primary light source is 80 to 100° with respect to the light output surface, and inclination of a prism surface far from the primary light source is 35 to 55° with respect to the light output surface.

In an aspect of the present invention, a layer having a refractive index smaller than a refractive index of a layer or a member in which the directional light output function unit is formed is laminated to fill concave and convex configuration of an elongated prism array of the directional light output function unit.

In an aspect of the present invention, onto the directional light output function unit, a prism sheet having an elongated prism array corresponding to an elongated prism array of the directional light output function unit in one side and being made of a material of a refractive index substantially equal to that of a layer or a member in which the directional light output function unit is formed, is fitted through a layer having a refractive index smaller than that of the layer or the member in which the directional light output function unit is formed so that the elongated prism arrays correspond to each other.

In an aspect of the present invention, the layer having the refractive index smaller than that of the layer or the member in which the directional light output function unit is formed is an air layer.

In an aspect of the present invention, the primary light source is a substantially point-shaped light source. In an aspect of the present invention, the primary light source is constituted of an LED. In an aspect of the present invention, the primary light source is a collection of LED's.

In an aspect of the present invention, a peak half value width of an emission pattern of the LED is 10 to 120° in a direction vertical to the light output surface of the light guide, and 80 to 180° in a direction parallel to the light output surface of the light guide.

In an aspect of the present invention, the primary light source uses means for dividing a light from at least one of the LED's to form a smaller division light sources and aligning the division light sources and/or means for converting a light from at least one of the LED's into a continuous linear light source. In an aspect of the present invention, a thickness of the light guide is reduced as a distance from the primary light source is increased. In an aspect of the present invention, at least one outputted light control member selected from a diffraction grating, a polarization conversion element, a polarization separation element and a light convergence element is arranged in the light output surface of the light guide.

In an aspect of the present invention, the primary light source is at least one point-shaped light source and, in the back surface of the light guide, a directional light output function unit is formed in which many arc-shaped elongated prisms each including two prism surfaces are arrayed in parallel with one another to surround the primary light source.

In an aspect of the present invention, the light leakage modulator is attached to the light output surface of the light guide. In an aspect of the present invention, each of the elongated prisms has a flat portion in a tip between the two prism surfaces. In an aspect of the present invention, a flat portion is formed in a valley between adjacent elongated prisms. In an aspect of the present invention, inclination of a prism surface of the elongated prisms near the primary light source is 80 to 100° with respect to the light output surface, and inclination of a prism surface far from the primary light source is 35 to 55° with respect to the light output surface.

In an aspect of the present invention, a layer having a refractive index smaller than a refractive index of a layer or a member in which the directional light output function unit is formed is laminated to fill concave and convex configuration of an elongated prism array of the directional light output function unit.

In an aspect of the present invention, onto the directional light output function unit, a prism sheet having an elongated prism array corresponding to an elongated prism array of the directional light output function unit in one side and being made of a material of a refractive index substantially equal to that of a layer or a member in which the directional light output function unit is formed, is fitted through a layer having a refractive index smaller than that of the layer or the member in which the directional light output function unit is formed so that the elongated prism arrays correspond to each other.

In an aspect of the present invention, the layer having the refractive index smaller than that of the layer or the member in which the directional light output function unit is formed is an air layer.

In an aspect of the present invention, the point-shaped light source is arranged so as to face a side end face or a corner of the light guide. In an aspect of the present invention, the point-shaped light source is arranged in a concave portion formed in the back surface opposite the light output surface of the light guide.

In an aspect of the present invention, the point-shaped light source is constituted of an LED. In an aspect of the present invention, the point-shaped light source is a collection of LED's. In an aspect of the present invention, a peak half value width of an emission pattern of the LED is 10 to 120° in a direction vertical to the light output surface of the light guide, and 80 to 180° in a direction parallel to the light output surface of the light guide.

In an aspect of the present invention, a thickness of the light guide is reduced as a distance from the primary light source is increased.

In an aspect of the present invention, at least one outputted light control member selected from a diffraction grating, a polarization conversion element, a polarization separation element and a light convergence element is arranged in the light output surface of the light guide.

In order to attain the above objects, according to the present invention, there is provided a surface light source device of an edge lighting system including as a primary light source the above-mentioned linear light source device which extends in a direction orthogonal to the light input end face.

In order to attain the above objects, according to the present invention, there is provided the above-mentioned light source device, wherein the device is a front lighting light source device to be arranged in an observation side with respect to an object illuminated by a light emitted from the light source device, and the light source device is transparent so as to transmit at least a part of the light from the object illuminated by the light source device to the observation side.

In order to attain the above objects, according to the present invention, there is provided a surface light source device comprising:
 at least one point-shaped light source;
 a rectangular light guide having a light input surface on which a light from the point-shaped light source is made incident and a light output surface for outputting an inputted light; and
 a directional light output function unit formed in a back surface of the light guide opposite the light output surface by arraying many arc-shaped elongated prisms each including two prism surfaces to surround the point-shaped light source in parallel with one another.

In an aspect of the present invention, each of the elongated prisms has a flat portion in a tip between the two prism surfaces. In an aspect of the present invention, a flat portion is formed in a valley between adjacent elongated prisms. In an aspect of the present invention, inclination of a prism surface of the elongated prisms near the point-shaped light source is 80 to 100° with respect to the light output surface, and inclination of a prism surface far from the point-shaped light source is 35 to 55° with respect to the light output surface.

In an aspect of the present invention, a layer having a refractive index smaller than a refractive index of a layer or a member in which the directional light output function unit is formed is laminated to fill concave and convex configuration of an elongated prism array of the directional light output function unit.

In an aspect of the present invention, onto the directional light output function unit, a prism sheet having an elongated prism array corresponding to an elongated prism array of the directional light output function unit in one side and being made of a material of a refractive index substantially equal to that of a layer or a member in which the directional light output function unit is formed, is fitted through a layer having a refractive index smaller than that of the layer or the member in which the directional light output function unit is formed so that the elongated prism arrays correspond to each other.

In an aspect of the present invention, the layer having the refractive index smaller than that of the layer or the member in which the directional light output function unit is formed is an air layer.

In an aspect of the present invention, the point-shaped light source is arranged so as to face a side end face or a corner of the light guide. In an aspect of the present invention, the point-shaped light source is arranged in a concave portion formed in the back surface opposite the light output surface of the light guide.

In an aspect of the present invention, the point-shaped light source is constituted of an LED. In an aspect of the present invention, the point-shaped light source is a collection of LED's. In an aspect of the present invention, a peak half value width of an emission pattern of the LED is 10 to 120° in a direction vertical to the light output surface of the light guide, and 80 to 180° in a direction parallel to the light output surface of the light guide.

In an aspect of the present invention, a thickness of the light guide is reduced as a distance from the primary light source is increased.

In an aspect of the present invention, at least one outputted light control member selected from a diffraction grating, a polarization conversion element, a polarization separation element and a light convergence element is arranged in the light output surface of the light guide.

BEST MODE FOR CARRYING OUT THE INVENTION

Next, preferred embodiments of the present invention will be described with reference to the accompanying drawings.

Figure 1:
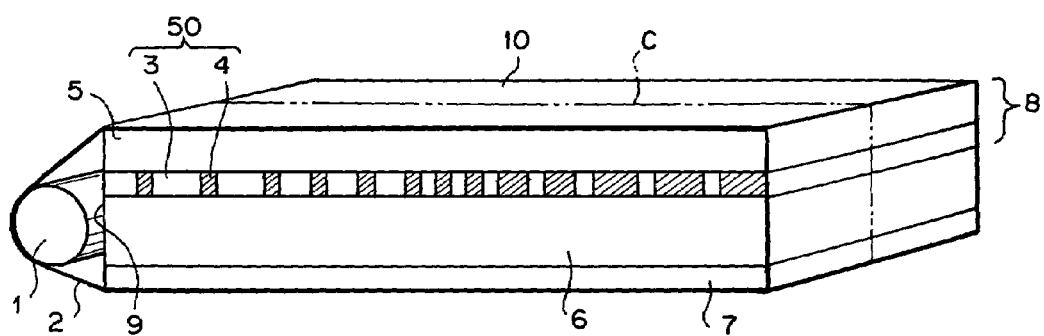
FIG. 1 is a schematic perspective view showing an embodiment of a surface light source device of the present invention.

FIG. 1 is a schematic perspective view showing a first embodiment of a surface light source device of the present invention. In FIG. 1, reference numeral 1 denotes a primary light source. As the primary light source 1, a self-emitting light source such as a cold-cathode tube, a fluorescent tube, an LED or an LED array can be used. Reference numeral 6 denotes a plate-like light guide of a refractive index ng constituting a slab waveguide. A light emitted from the primary light source 1 is partially reflected by an operation of a reflector 2, made incident on the inside of the light guide 6 from an edge face (light input end face or light input surface or light incident end face) 9 confronting the primary light source 1, propagated through the light guide 6, and uniformly outputted from a light output surface or light emitting surface 10 through a light leakage modulator or leaky ray modulator 8. As shown, the light leakage modulator 8 is positioned integrally with the light guide 6 on an upper surface (light output surface) of the light guide 6, and a reflecting plate 7 is arranged on a bottom surface (back surface or an opposite surface) of the light guide 6. Incidentally, the light leakage modulator 8 may be positioned on the bottom surface of the light guide 6. In this case, the upper surface of the light guide 6 becomes a light output surface.

The surface light source device of the embodiment is used for a back-lighting system arranged on a back surface of a transmission type liquid crystal display device. In the case of use for illumination of a reflection type liquid crystal display device, the surface light source device can be applied on a front-lighting system by removing the reflecting plate 7 and securing light transmission in a direction substantially orthogonal to the light output surface 10 (simply referred to as "normal direction", hereinafter). Additionally, the surface light source device of the embodiment can be used as a relatively large surface light source for a billboard or an illumination device.

A plurality of linear or bar-like light source devices are obtained by cutting the surface light source device of the embodiment at a plurality of cut planes C (only one is shown by a virtual line in FIG. 1) orthogonal to both of the light input surface 9 and the light output surface 10 (i.e., orthogonal to the primary light source 1), parallel to each other and positioned at proper interval (e.g., width larger by five times or less than a thickness of the light guide 6). As an application example of such a linear light source, a device using a very small light source such as an LED for the primary light source 1 can be cited. According to this example, it is possible to obtain a light source having a belt-like outputted light distribution high in a uniformity ratio of luminance in a longitudinal direction of the linear light source device. Such a linear light source device can also be applied as a primary light source or the like for a back-lighting system of a portable electronic device.

Next, description will be made of the surface light source device of the present invention. However, it should be noted that since the explanation of the invention content of the surface light source device can be directly applied to the linear light source device as described above, explanation of the linear light source device is included in the description while there is no special mention of the linear light source device.

Now, as shown in FIG. 1, the light leakage modulator 8 includes a composite layer 50 constituted of a low refractive index region (first refractive index region) 3 of a refractive index n1 and a high refractive index region of a refractive index n2 (second refractive index region) 4 (here, n2>n1), and a light output control function layer (third refractive index layer) 5 of a refractive index n3 (here, n3>n1). The light output control function layer 5 has its bottom surface tightly fixed to the composite layer 50, and its upper surface is set as a light output surface 10. As shown, in the composite layer 50, the low refractive index region 3 and the high refractive index region 4 are alternately arrayed in a direction orthogonal to the light input surface 9 of the light guide 6, and each of the low refractive index region 3 and the high refractive index region 4 extends uniformly in a direction parallel to the primary light source 1. That is, each of the low refractive index region 3 and the high refractive index region 4 is formed in a belt shape extending in the direction parallel to the primary light source 1.

The low refractive index region 3 and the high refractive index region 4 are not limited to ones having a substantially rectangular cross-sectional shape similar to that shown in FIG. 1, i.e., an alternate array structure of a rectangular parallelepiped. For example, there may be used regions having a structure where a height H1 (or H2) of a low refractive index region (or high refractive index region) is larger than a height H2 (or H1) of the high refractive index region (or low refractive index region), a substantially semicircular structure, a structure where a cross-sectional shape of the high refractive index region 4 has a curved line partially or entirely (structure having a curved surface), or the like.

Figure 2:
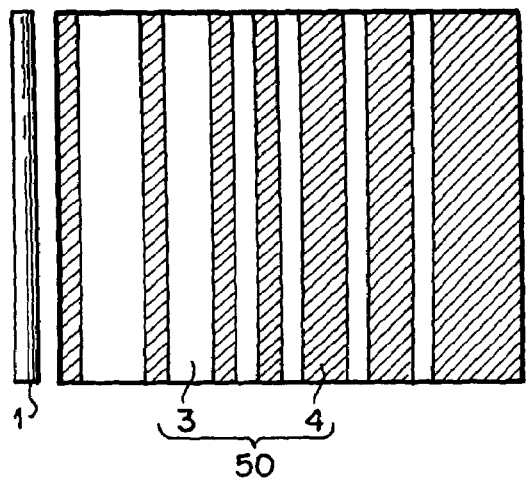
FIG. 2 is a schematic plan view showing a positional relationship between low and high refractive index regions of a composite layer and a primary light source.

FIG. 2 is a plan view showing a positional relationship between the composite layer 50 and the primary light source 1. As it is more apart from the primary light source 1, a width of the low refractive index region 3 (dimension in a direction orthogonal to the primary light source 1) becomes gradually smaller while a width of the high refractive index region 4 becomes gradually larger.

Figure 3:
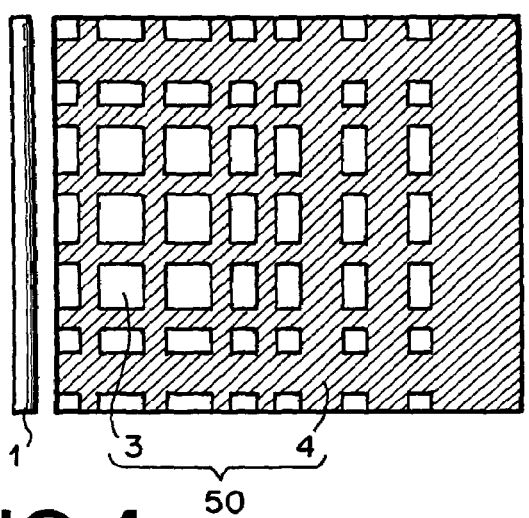
FIG. 3 is a schematic plan view showing a positional relationship between low and high refractive index regions of a composite layer and a primary light source.
Figure 4:
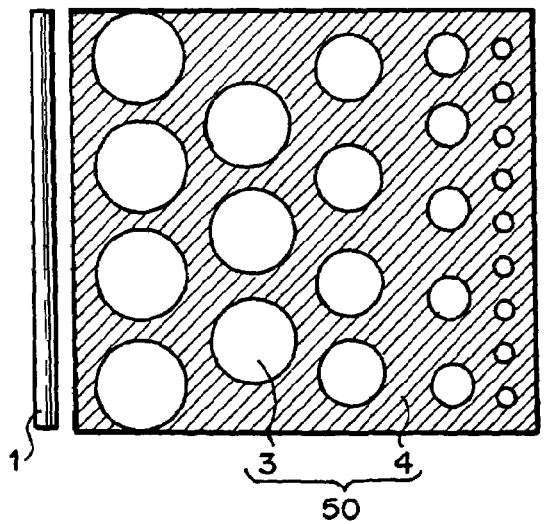
FIG. 4 is a schematic plan view showing a positional relationship between low and high refractive index regions of a composite layer and a primary light source.

FIGS. 3 and 4 are schematic plan views showing modified examples of the composite layer 50, in which the primary light source 1 is also shown. In the example of FIG. 3, the low refractive index region 3 and the high refractive index region 4 are alternately arrayed in both directions orthogonal and parallel to the primary light source 1, and the high refractive index region 4 is in a lattice shape. As it is more apart from the primary light source 1, a width of the low refractive index region 3 parallel to the primary light source 1 (dimension in a direction orthogonal to the primary light source 1) becomes gradually smaller while a width of the high refractive index region 4 parallel to the primary light source 1 becomes gradually larger. Approaching to both sides from a center in a direction parallel to the primary light source 1, a width of the low refractive index region 3 orthogonal to the primary light source 1 (dimension in a direction parallel to the primary light source 1) becomes gradually smaller while a width of the high refractive index region 4 orthogonal to the primary light source 1 becomes gradually larger. In the example of FIG. 4, the low refractive index region 3 and the high refractive index region 4 constitute a sea-island structure where the low refractive index region forms an island portion and the high refractive index region 4 forms a sea portion. A size of the low refractive index region 3 becomes gradually smaller as it is more apart from the primary light source. That is, more apart from the primary light source 1, a ratio of an area occupied by the low refractive index region 3 is reduced.

Figure 18:
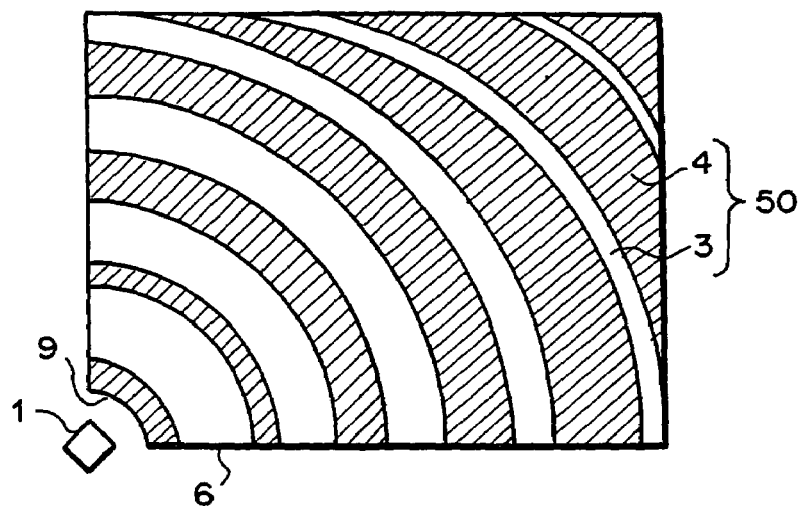
FIG. 18 is a schematic plan view showing a positional relationship between low and high refractive index regions of a composite layer and a primary light source.
Figure 19:
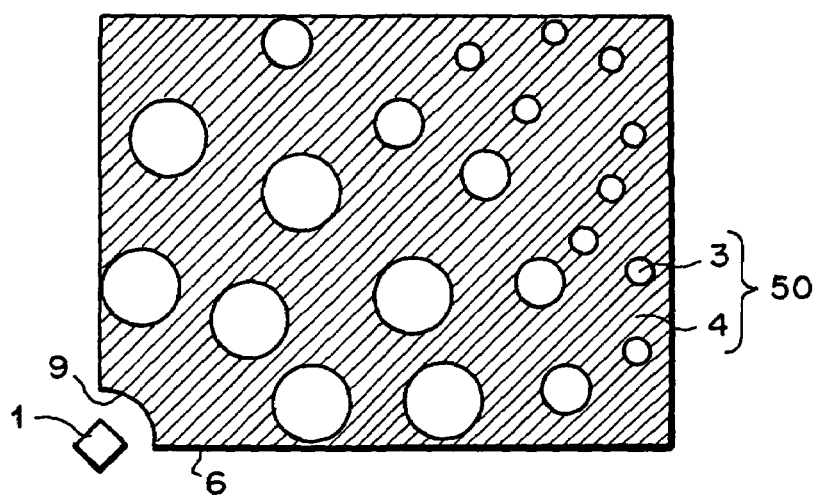
FIG. 19 is a schematic plan view showing a positional relationship between low and high refractive index regions of a composite layer and a primary light source.
Figure 20:
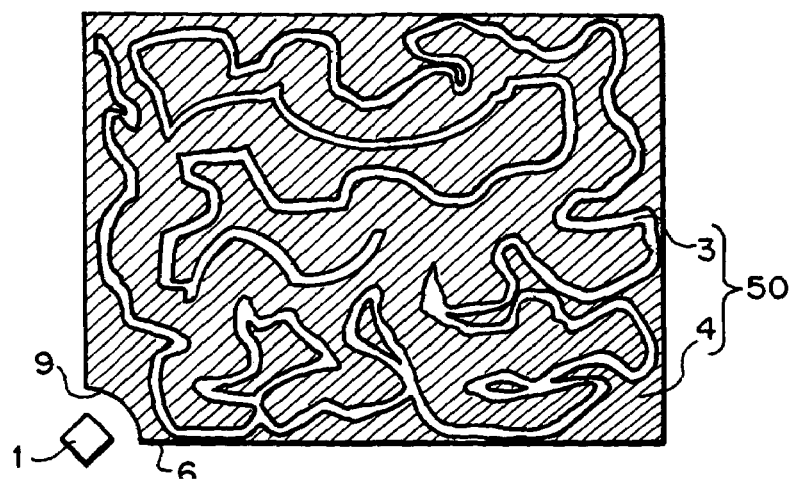
FIG. 20 is a schematic plan view showing a positional relationship between low and high refractive index regions of a composite layer and a primary light source.

FIGS. 18 to 20 show examples of composite layers 50 in a surface light source device using as a primary light source 1 a point-shaped light source arranged adjacently to a light input end face 9 formed at a corner of a light guide 6. In the example of FIG. 18, a low refractive index region 3 and a high refractive index region 4 are arrayed concentrically around the primary light source 1. In the example of FIG. 19, the low refractive index region 3 and the high refractive index region 4 are arrayed in a sea-island structure. In the example of FIG. 20, the low refractive index region 3 and the high refractive index region 4 are irregularly distributed to form a fractal pattern where statistical similarity of pattern shapes of its irregular structure is high in microscopic and macroscopic regions and filling efficiency of mutual patterns is high. In each example, as it is more apart from the primary light source 1, a ratio of an area occupied by the low refractive index region 3 is reduced.

As an array pattern of the low refractive index region 3 and the high refractive index region 4 in the composite layer 50, various types such as any one of the aforementioned patterns combined with the other thereof can be used.

Figure 5:
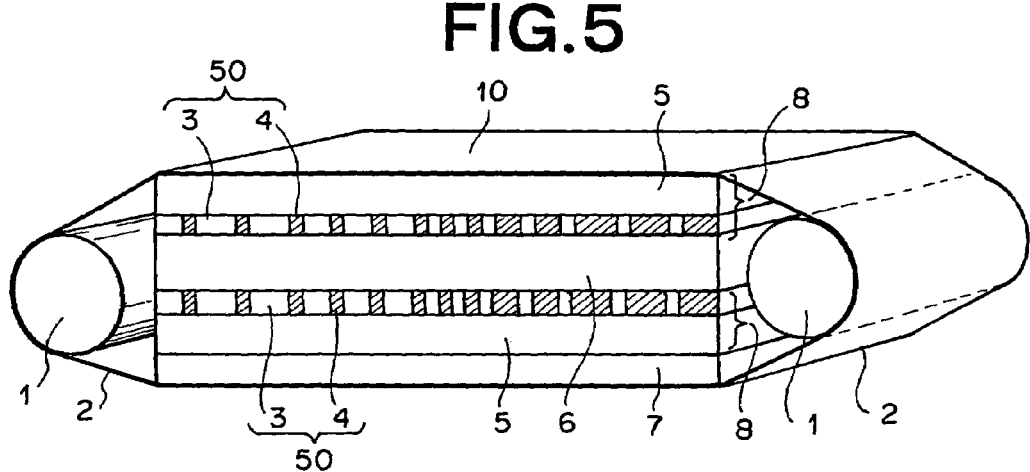
FIG. 5 is a schematic perspective view showing an embodiment of a surface light source device of the present invention.

FIG. 5 is a schematic perspective view of a second embodiment of a surface light source device of the present invention. According to the embodiment, light leakage modulators 8 are arranged on both upper and bottom surfaces of a light guide 6. A reflecting plate 7 is attached to a bottom surface of a light output control function layer 5 of the light leakage modulator 8 of the bottom surface side. Additionally, according to the embodiment, primary light sources 1 to which reflectors 2 are attached are arranged to face edge faces of opposite sides of the light guide 6.

Next, description will be made of a function of the light leakage modulator 8 in the surface light source device, especially an outputted light luminance distribution control function.

The light output control function layer 5 has a function of outputting a major part of a light made incident on the light leakage modulator 8 from the light guide 6 through a light output surface 10 to the outside. A maximum guided mode of a light made incident from the edge face 9 of the light guide 6 and propagated in the light guide is mainly defined by a difference in refractive indices between the low refractive index region 3 and the light guide 6. When rays of light travel from the light guide 6 to the low refractive index region 3, propagation mode lights satisfying total reflection conditions based on Snell's law, i.e. lights having incident angles equal to/higher than a total reflection critical angle $\Theta 1$ decided by a relationship between ng and n1, are all set to a total reflection mode to be propagated in the light guide. When these total reflection mode lights meet the high refractive index region 4 in the process of propagation in the light guide, in the case of ng>n2>n1, a propagation mode light having an incident angle smaller than a new total reflection critical angle $\Theta 2$ ($\Theta 2>\Theta 1$) defined by a relationship between n2 and ng and larger than $\Theta 1$ is leaked through the high refractive index region 4 to the light output control function layer 5. Thus, by properly changing an occupation density of the high refractive index region 4 in the composite layer 50 (area occupied by the high refractive index region 4 per unit area of the composite layer 50) depending on places in the surface of the composite layer 50, the amount of light reaching the light output control function layer 5 can be controlled to a desired value. As means for changing the occupation density of the high refractive index region 4, there are available a method simultaneously using plural patterns similar to those shown in FIGS. 2 to 4 and FIGS. 18 to 20 or other complex pattern changes, a method of setting similar pattern shapes and changing an area of the high refractive index region 4 from place to place, a method using completely identical pattern shapes and changing an array pitch (P) thereof, etc.

Then, by properly selecting a difference between the refractive index ng of the light guide 6 and the refractive index n2 of the high refractive index region 4, the total reflection critical angle $\Theta 2$ can be set to a desired value to thereby control the outputted light distribution. For example, in the case of a design where a difference between ng and n2 is set larger and a value of $\Theta 2$ is set smaller, an amount ratio of light totally reflected on a boundary between the high refractive index region 4 and the light guide 6 is increased, and a greater amount of light can be propagated while limiting light leakage efficiency to a place far from the primary light source 1. Thus, it is possible to control an outputted light distribution by changing the difference between ng and n2 from place to place in the light leakage modulator 8.

As described above, according to the surface light source device of the present invention which comprises the light leakage modulator, by several of the aforementioned means, the amount of light reaching the light output control function layer 5 can be freely adjusted. Even if changes occur in the size or shape of the light guide 6, the type of the primary light source 1, the light output efficiency in the light output control function layer 5 etc., it is possible to easily realize a surface light source device having a high uniformity ratio and high reproducibility by controlling the outputted light distribution basically independently of such changes.

Furthermore, by the outputted light distribution control technology of the present invention, it is possible to intentionally make non-uniform the outputted light luminance distribution in the light output surface by a desired mode. As an example of such a non-uniform outputted light luminance distribution mode, an inclination distribution having the amount of outputted light gradually increased/decreased depending on a distance from the primary light source 1 can be cited.

The case of ng>n2 has been described. Generally, light controllability can be explained by the following three cases (classification) depending on relationships among the refractive indices n2, n3 and ng. In the surface light source device of the present invention, relationships of n1<ng, n1<n2 and n1<n3 are always established.

Functionality regarding a directional light output function, a light diffusion function, a polarization control function, a light diffraction function or the like for the light introduced from the light guide 6 into the light leakage modulator 8 can be imparted to the light output control function layer 5. For practical purposes, in order to efficiently execute such a light control function, and increase a uniformity ratio of the luminance distribution in the light output surface or achieve desired inclination luminance distribution characteristics, preferably, the aforementioned relationships of the refractive indices, the internal structure of the light leakage modulator 8, the occupation density distribution of the high refractive index region 4 in the surface of the light leakage modulator 8, the shapes of a later-described mode conversion mechanism and the entire surface light source device, a mode of incident light from the primary light source 1 etc. must be optimized.

1) In the case of $n2 \geq n3 \geq ng$ or $n3 \geq n2 \geq ng$

When this relationship is established, a propagation mode light in the light guide having an incident angle larger than a critical angle $\Theta 1$ defined by the relationship between n1 and ng is entirely transmitted through the high refractive index region 4 to the light output control function layer 5. On the other hand, regarding a light first made incident on the light output control function layer 5 and then partially retuned to the light guide 6, such a light is limited to a high-order mode light having an incident angle smaller than a critical angle $\Theta 3$ defined by the relationship between n3 and ng. Thus, a probability of the light made stationary in the light output control function layer 5 is increased, creating a tendency of strong influence of the light function control.

2) In the case of $n2 \geq ng \geq n3$ or $ng \geq n2 \geq n3$

When this relationship is established, only a part of high-order propagation mode light having an incident angle larger than the critical angle $\Theta 1$ and smaller than the critical angel $\Theta 3$ is transmitted through the high refractive index region 4 to the light output control function layer 5. Since other low-order mode lights always satisfy the total reflection condition, a probability of propagation of a greater amount of light far from the primary light source 1 is increased as compared with the case of 1). Regarding a light first made incident on the light output control function layer 5 and then partially returned to the light guide 6, there are no mode regulation and all mode lights can be returned to the light guide 6. Thus, a probability of the light made stationary in the light output control function layer 5 is small, providing a small effect of suppressing the influence of the light function control.

3) In the case of $n3 \geq ng \geq n2$ or $ng \geq n3 \geq n2$

When this relationship is established, only a high-order propagation mode light having a total reflection angle larger than the total reflection critical angle $\Theta 1$ and smaller than the critical angle $\Theta 2$ defined by the relationship between n2 and ng can be transmitted through the high refractive index region 4 to the light output control function layer 5. Since other low-order propagation mode lights always satisfy the total reflection condition, a probability of propagation of a greater amount of light from the primary light source 1 becomes higher as compared with the case of 1). On the other hand, regarding a light first made incident on the light output control function layer 5 and then partially returned to the light guide 6, such a light is subjected to mode regulation by a critical angle $\Theta 23$ defined by the relationship between n3 and n2. Thus, a probability of the light made stationary in the light output control function layer 5 becomes higher than that of 2), creating a tendency of being easily influenced slightly by the light function control.

It is preferable that the aforementioned different characteristics based on the relationships of the refractive indices are used properly in accordance with kinds or characteristics of the light control functions of the light output control function layer 5. Depending on cases, some relationships of the refractive indices can be simultaneously used in the same surface light source device, and these relationships can be used properly from place to place in the surface of the light leakage modulator 8. Additionally, as described in the above classification, the influence on the outputted light luminance distribution characteristics and the functionality appearance effect are varied depending on the relationships among the refractive indices n2, n3 and ng. Thus, it is also possible to control the outputted light luminance distribution characteristics and the functionality appearance effect by changing the relationships of these refractive indices in the surface of the light leakage modulator 8.

Figure 6:
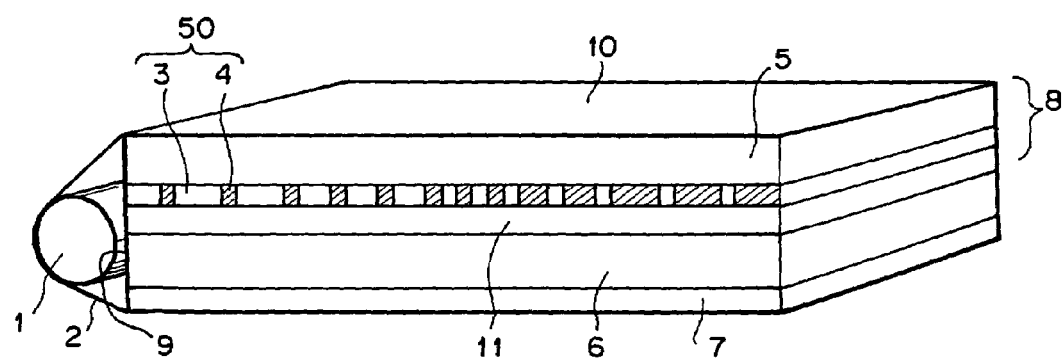
FIG. 6 is a schematic perspective view showing an embodiment of a surface light source device of the present invention.

FIG. 6 is a schematic perspective view showing a third embodiment of a surface light source device of the present invention. In the drawing, members similar to those of FIGS. 1 to 5 are denoted by similar reference numerals. According to the embodiment, an additional layer (fourth refractive index layer) 11 of a refractive index n4 (here, n4>n1) is disposed between a composite layer 50 of a light leakage modulator and a light guide 6. The additional layer 11 functions similarly to the high refractive index region 4. Even in the case of n2=n3, the additional layer 11 can play a similar role in place of the high refractive index region 4.

Thus, the embodiment has the features that the formation of the additional layer 11 on the upper side of the light guide 6 by uniform application or the like enables the additional layer 11 to play the role similar to that of the high refractive index region 4 of the composite layer 50 and the same materials can be used for both the high refractive index region 4 and the light output control function layer 5 in the light leakage modulator, that is, a relationship n2=n3 can be established. The embodiment is apparently advantageous for reducing costs in industrial manufacturing of the surface light source device of the present invention.

As means for obtaining an outputted light higher in directionality, the refractive index n2 (or n4) of the high refractive index region 4 (or additional layer 11) and the refractive index ng of the light guide are set so as to establish a relationship of n2<ng (n4<ng). Accordingly, rays of light made incident on the high refractive index region 4 can be limited to a light of a transmission mode in a predetermined limited range as described above.

Figure 7:
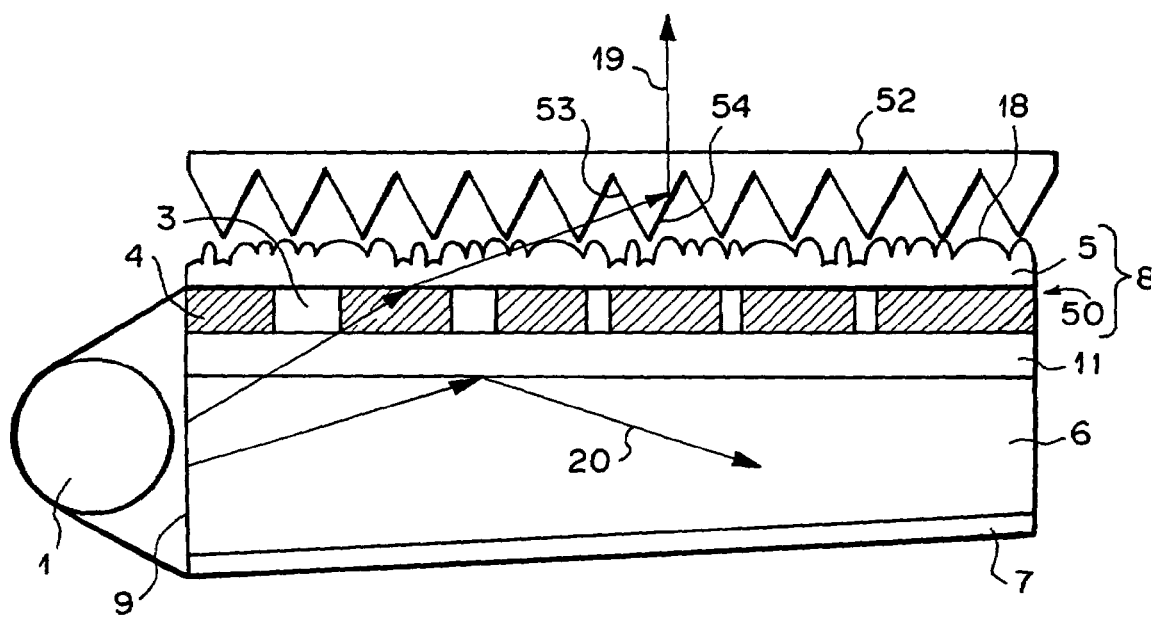
FIG. 7 is a schematic cross-sectional view showing an embodiment of a surface light source device of the present invention.

However, in a parallel flat plate waveguide, since residual accumulation of low-order mode light occurs in the light guide 6 as it is more apart from the primary light source 1, a mechanism is preferably disposed to always convert the low-order mode light into a high-order mode light. As such means, it can be effective that a thickness of the light guide 6 may be gradually reduced more apart from the primary light source 1 as shown in FIG. 7, i.e. the light guide 6 is formed in a wedge shape, and/or light diffusion material is incorporated into the light guide 6, and/or a roughened surface, a microprism, a lattice shape, a notch or the like is formed in the back surface of the light guide 6. Of these, the introduction of the wedge shape is effective means for enabling continuous and easy mode conversion control with respect to a distance from the primary light source 1.

FIG. 7 shows an embodiment of the surface light source device which includes the additional layer 11 of a low refractive index for the purpose of controlling a guided mode in the light guide 6, employs the light leakage modulator 8 having a light diffusion function unit 18 as the light output control function layer 5, and uses a downward prism sheet 52 having a plurality of triangular elongated prisms. As shown, a feature of the downward prism sheet 52 is that the light made incident from one prism face 53 of each elongated prism at a predetermined angle is totally reflected on the other prism face 54, to thereby realize upward changing an angular direction of the light toward a direction of a normal of the light output surface of the light guide 6 (or the light output control function layer 5).

The light diffusion function unit 18 may be prepared by dispersing and applying a light diffuser such as titanium oxide on the light output surface. However, in order to sufficiently bring out the function of the downward prism sheet 52, preferably, a light having directionality in a desired direction is emitted from the light diffusion function unit 18, and the light is made incident on the downward prism sheet 52 at a desired angle. If only the light diffuser is dispersed for the light diffusion function unit 18, an outputted light is widely spread, creating a tendency of impossibility of obtaining a satisfactory directional light output.

Conventionally, to impart a desired directional light output function to the layer having the light diffusion function, a method for transferring a mat finished shape of a mold blast-processed by using minute sands or glass beads to the light output surface of the light guide or the like has been employed. In this case, as means for adjusting a luminance uniformity ratio in the light output surface of the surface light source device, a method for providing an uneven distribution of blast strength to the mold (i.e., blast strength is changed in accordance with an in-plane position) is employed, whereby a distribution of light output efficiency is adjusted to balance an in-plane luminance distribution. However, there are difficulty and limit to subtle control of light output efficiency by the blast processing method. It is difficult to find optimal processing conditions, and formation of outputted light control means is complex and requires time and labor. Furthermore, some problems to be solved in reproducibility of a uniformity ratio etc. remain.

On the other hand, in the case of using the light leakage modulator 8 of FIG. 7, the function of outputting a light with directionality in a desired direction in accordance with the downward prism sheet 52 is transferred to the mat finished shape of the mold transfer by the blast method, and control of the uniformity ratio can be carried out by using basic characteristics of the light leakage modulator 8 independently of directional output control. Thus, the complex in-plane uniformity ratio control in blast processing is made unnecessary, subtle distribution control of light output efficiency is enabled, reproducibility of the uniformity ratio is high, and designing becomes easy.

If the additional layer 11 of a low refractive index is disposed, controls of a propagation mode in the light guide and a light leakage mode to the light output control function layer 5 having the light diffusion function unit 18 can be carried out, and a narrow visual field surface light source device having narrow light output distribution characteristics can be obtained. Description will be made by taking a more specific example. If the refractive index ng of the light guide 6 of FIG. 7 is set to 1.49 and the refractive index of the low-refractive index additional layer 11 is set to 1.40, in accordance with Snell's law of reflection and transmission, a low-order mode light 20 having an angle formed with the light output surface of the light guide set to about 20° or lower is totally reflected into the light guide 6 without being transmitted through the additional layer 11. On the other hand, a light 19 having an angle formed with the light output surface of the light guide 6 exceeding 20° and approaching about 48° is transmitted through the additional layer 11 to reach the light diffusion function unit 18 of the light output control function layer 5, and then outputted to the outside by specific directionality. Subsequently, the outputted light is raised upward by the downward prism sheet 52 designed to efficiently change the angular direction in the normal direction of the light output surface of the light guide 6 based on the above directionality, whereby a surface light source device narrow in visual field and high in luminance is realized. Also in this case, low-order mode light are easily residually accumulated in the light guide 6 more apart from the primary light source 1. Thus, in order to solve this problem, preferably, a wedge-shaped structure where a thickness of the light guide 6 is changed more apart from the primary light source 1, and/or a mode conversion mechanism for converting the low-order propagation mode light into a high-order propagation mode light are disposed.

On the other hand, if the additional layer 11 is not disposed, propagation lights of all modes from 0° to near 48° reach the light output control function layer 5. Accordingly, an outputted light having a spread distribution due to all the modes is obtained from the light output control function layer. A light subsequently directed substantially in the normal direction by using the downward prism sheet 52 results in formation of an outputted light distribution having a wider visual field angle as compared with the case of using the additional layer 11 of the low refractive index.

Additionally, as described above, not only the directional output function but also various functions such as the polarization control function having a laminated film/sheet or a double refraction sheet, the light diffusion function using a diffusion material, a microlens, a mat finished structure or the like, the light diffraction function having a diffraction grating, etc. can be imparted to the light output control function layer 5, whereby a function layer having a high uniformity ratio can be realized.

Furthermore, average sizes (thickness) H1, H2 in the direction vertical to the array direction of the low refractive index region 3 and the high refractive index region 4 and/or a thickness H4 of the additional layer 11 are very small, unnecessary transmission (exudation) of a light wave to the light output control function layer 5 occurs, which may make it impossible to obtain a satisfactory target function. Referring to a light leakage control function, there is no problem if an optically necessary thickness is set to about a level (1 μm an or higher) which can prevent light wave exudation. However, when the sizes H1, H2 become very small, there is a possibility of a reduction in dimensional accuracy in the manufacturing process. Thus, these sizes are preferably set to 5 μm or higher, more preferably in a range of 10 μm or higher.

Figure 8:
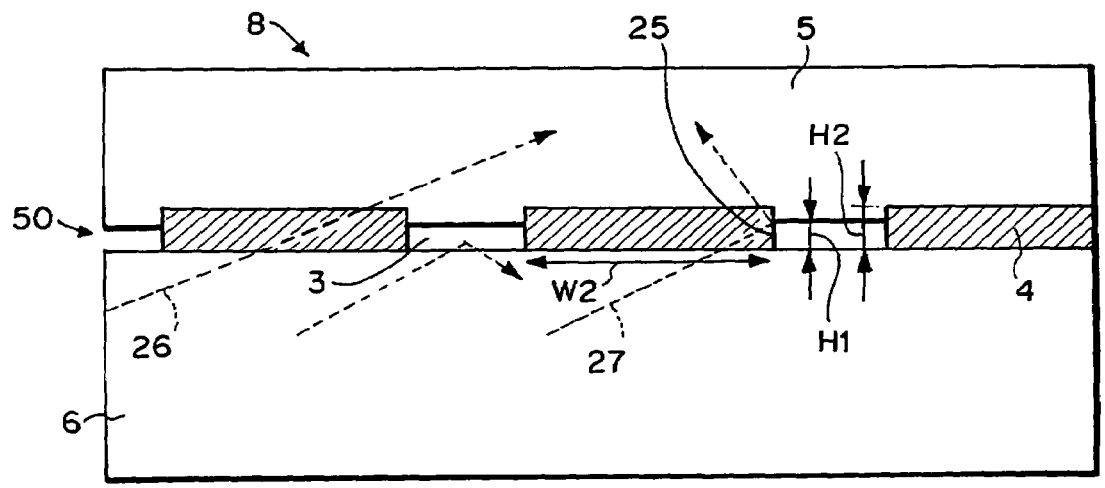
FIG. 8 is a view showing an average thickness of a low refractive index region and an average width of a high refractive index region of a light leakage modulator.

FIG. 8 shows a relationship between the average thickness H1 of the low refractive index region 3 and an average width W2 of the high refractive index region 4 in the light leakage modulator 8. If the size H1 and/or the size of the average thickness H2 of the high refractive index region 4 is too large, unnecessary reflection light 27 may occur in the boundary between the low refractive index region 3 and the high refractive index region 4, diffusion or scattering of light may be increased, and even a material cost increase may occur. Thus, H1 and H2 are set to 200 μm or lower, preferably 100 μm or lower. However, if the surface light source device is enlarged in area, these sizes must be set to 200 μm or higher following a screen size increase in the array direction of the low refractive index region 3 and the high refractive index 4.

If a value of W2/H1 is large, a probability of incident rays of light reaching to a side face 25 of the low refractive index region 3 is small. Thus, an unnecessary irregularly reflected or transmitted light 27 is suppressed, and light leakage control of a propagated light from the light guide 6 to the light output control function layer 5 which is a main purpose of the function of the light leakage modulator is faithfully achieved without any interference. This is achieved irrespective of presence of the additional layer 11.

Additionally, if it is necessary to actively leak a light incident on the high refractive index region 4 having a smaller angle (low-order mode light) relative to the array direction of the low refractive index region 3 and the high refractive index region 4 of the light leakage modulator 8 into the light output control function layer 5, a value of W2/H1 must be set larger. Thus, a relationship between the refractive indices n2 and ng for limiting the mode of a light transmitted through the high refractive index region 4 has a great concern in designing of the value of W2/H1 as described above. This also holds true when the additional layer 11 is attached. For example, if a value of n2/ng is smaller than 1, a light leakage mode (26) of a low-order mode light to the high refractive index region 4 is greatly limited, and thus a value of W2/H1 may be set to a relatively small value, i.e., 1 to 2. However, assuming that a need arises to design a value of n2/ng to be 1 or larger than 1, if more light leakages of a low-order mode light into the light output control function layer 5 are necessary, a low-order mode light of a considerably large incident angle must be leaked through the high refractive index region 4, and thus a value of W2/H1 must be set equal to/higher than 2. For the purpose of suppressing a ratio of an irregular reflection light 27 as much as possible and faithfully carrying out light leakage control, a value of W2/H1 must be set equal to/higher than 3, preferably 5 or more, more preferably 8 or more. If there is a need to actively leak a propagation mode light having an incident angle near 90°, preferably, the aforementioned mode conversion function (e.g., by wedge-shaped light guide) from a low-order mode to a high-order mode is used. However, if a value of W2/H1 is large more than necessary, although there are effects of an output area of the light guide 6, a size of H1 and necessary resolution as a surface light source, a pattern dimension of a light leakage part becomes larger than resolution of human eye, creating a possibility of visual recognition of a defect of a luminescent spot. Therefore this value is not preferable. A value of W2/H1 is preferably set equal to/lower than 30, more preferably in a range of 10 or lower.

Further, generally, cross-sectional shapes of the low refractive index region 3 and the high refractive index region 4 may be substantially rectangular (no special cross-sectional shapes are necessary). A larger value of W2/H1 is preferable. This is because of the difficulty of unnecessary irregular reflection in the boundary 25 between the low refractive index region 3 and the high refractive index region 4, and several manufacturing advantages such as easy mold manufacturing when the light leakage modulator 8 is manufactured in mold transfer formation by using a photo-setting resin, an increase of releasing a molded product from the mold during molding, etc.

However, in the substantially rectangular cross-sectional shape described here, the cross-sectional shapes of the low refractive index region 3 and the high refractive index region 4 which are not completely rectangular, for example slightly tapered shapes of the side end faces of the low refractive index region 3 and the high refractive index region 4 in contact with each other, are also included. These are rather preferable as means (taper for release) for increasing release performance when the molded product is peeled off from the mold in manufacturing of the light leakage modulator 8 by mold transfer.

Figure 9:
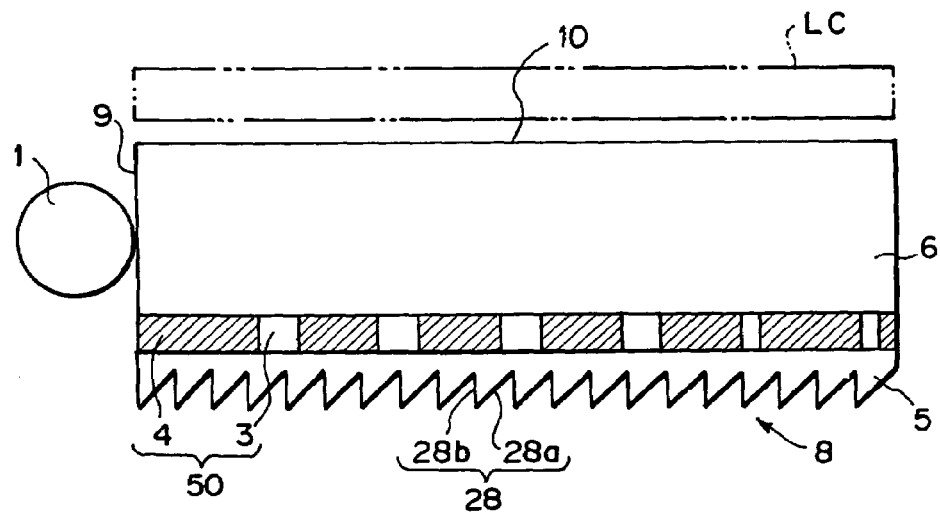
FIG. 9 is a schematic cross-sectional view showing an embodiment of a surface light source device of the present invention.

FIG. 9 is a schematic cross-sectional view showing a still another embodiment of a surface light source device of the present invention. According to the embodiment, in a light leakage modulator 8 for imparting high uniformity ratio of an outputted light, a plurality of elongated prisms 28 are formed on a surface of a light output control function layer 5 for obtaining good high luminance output directionality. That is, the light leakage modulator 8 is disposed in a back surface opposite a light output surface of a light guide 6 which functions as a light output surface 10 of the surface light source device, and many elongated prisms 28 each having two prism surfaces 28a, 28b are formed in a bottom surface of the light output control function layer 5. These elongated prisms 28 are arrayed in parallel with one another and in a direction substantially vertical to a propagation direction of a light in the light guide. This arrangement is made because a light rises most efficiently in a normal direction in a state where a ridgeline of the elongated prism is always orthogonal to a propagation direction of an incident light. According to the embodiment, the elongated prisms 28 are arrayed in a direction substantially parallel to a light input surface 9 of the light guide 6. Especially, in the case of using a point-shaped light source as a primary light source 1, preferably, an optimal elongated prism pattern similar to the later described arc-shaped pattern such as a circular arc-shaped pattern surrounding the light source 1 is formed in accordance with arrangement of the point-shaped light source. Incidentally, the elongated prisms may be formed in the light output control function layer 5, or in an accessory portion prepared separately from a main body of the light output control function layer 5 and arranged so as to be tightly fixed to the main body.

By properly designing the prism surfaces 28a, 28b of each of the elongated prisms 28, a peak output angle can be freely set. If one side face [face of a side far from the primary light source 1] (first prism surface) 28a of the elongated prism 28 is set to an inclination angle of 35° or higher and 55° or lower with respect to the light output surface and the back surface of the light guide 6, and the other side face [face of a side near the primary light source 1] (second prism surface) 28b is set to an inclination angle of 80° to 100° with respect to the light output surface and the back surface of the light guide 6, a peak light of an outputted light can be directed substantially in a normal direction of a light output surface 10, and an angular distribution of an outputted light can be narrowed. Regarding directionality in the normal direction, preferably, an inclination angle of the first prism surface 28a is set in a range of 40 to 50°, and that of the second prism surface 28b is set in a range of 85 to 95°.

A pitch of the elongated prisms 28 formed can be properly selected in a range sufficient to enable processing, preferably in a range of 10 to 500 µm, more preferably in a range of 30 to 300 µm. For the purpose of prevention of Moire, the pitch of the elongated prisms 28 may be partially or continuously changed. If the surface light source device is enlarged or a ratio of a length with respect to a thickness of the light guide 6 is enlarged tending to reduce a uniformity ratio in the light output surface, it is possible to increase an improvement effect of a uniformity ratio by partially or continuously changing the pitch of the elongated prisms 28. Further, the prism surface may be a planar or curved surface having a predetermined curvature, and it is possible to make an angular distribution of the outputted light slightly wider.

In the aforementioned elongated prism 28, light use efficiency in a tip of the prism shape is lower. Accordingly, even if the tip of the elongated prism 28 is flat or processed in any shapes such as a polygon or an R shape in cross-section, influence is not so high on optical performance. Formation of a flat portion by making flat the tip of the elongated prism 28 is preferable because damaging of the prism surface by friction or the like is reduced. Moreover, it is possible to control the amount of outputted light by making flat (approximately parallel to a joined surface of the light output control function layer 5 and the composite layer 50) a valley between adjacent elongated prisms 28 to form a flat portion. By changing a degree of processing such as depths or types of the tip and the valley of the elongated prism 28, it is possible to control a distribution of an outputted light.

Figure 21:
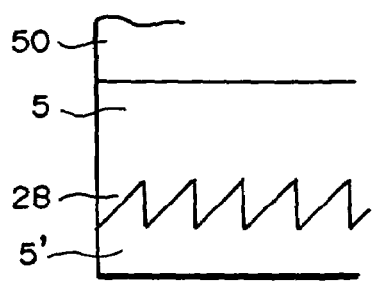
FIG. 21 is a schematic partial cross-sectional view showing a lamination of a low refractive index layer with elongated prisms of a light output control function layer.

A function of the first prism surface 28a of the elongated prism 28 is to direct rays of light in the normal direction of the light output surface 10 of the light guide 6 by totally reflecting the rays of light. If this function can be satisfied, as shown in FIG. 21, it is possible to employ a structure where a layer 5' having a refractive index (n5) lower than a refractive index (n3) of the elongated prism 28 is laminated outside the array of the elongated prisms 28 to fill concave and convex configurations of the elongated prism array. If this structure is employed, damaging of the prism surface by friction or incursion of stains into the concave and convex configurations of the elongated prism array is prevented.

Figure 22:
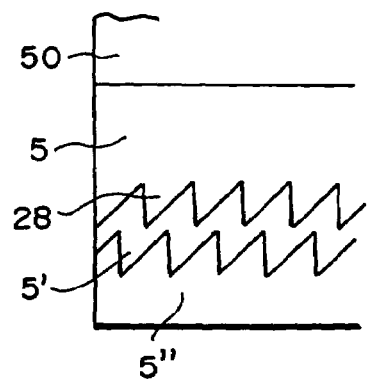
FIG. 22 is a schematic partial cross-sectional view showing a lamination of a low refractive index layer and a prism sheet with elongated prisms of a light output control function layer.

Further, as shown in FIG. 22, it is possible to employ a structure where a prism sheet 5" having an elongated prism array of substantially the same shape as that of the concave and convex configurations of the elongated prism 28 (i.e., elongated prism array of a shape corresponding to that of the concave and convex shape of the array of the elongated prism 28) and being made of a transparent material of a refractive index substantially the same as that of the light output control function layer 5 in which the array of the elongated prisms 28 is formed is fitted to the outer side of the array of the elongated prisms 28 through a layer 5' of a refractive index (n5) lower than the refractive index (n3) of the light output control function layer 5 (i.e., structure where the first prism surface and the second prism surface of the elongated prism 28 are arranged to face the corresponding prism surfaces of the prism sheet through the low refractive index layer). For a material of the low refractive index layer, both organic and inorganic materials can be used, and even air can be used. Also in the case of this structure, it is possible to prevent damaging of the prism surface by friction or incursion of stains into the concave and convex configuration of the elongated prism array.

Additionally, it is possible to use the device as a front-lighting surface light source device by properly setting a prism shape of the elongated prism 28, especially setting an angle of the prism surface to a proper value. That is, in the device of FIG. 9 as the front-lighting surface light source device, a reflection type liquid crystal display device LC is arranged on the light output surface 10, a light is outputted from the light output surface 10 toward the liquid crystal display device LC by an operation of the elongated prism 28, the outputted light is reflected by the reflection type liquid crystal display device LC, and then returned as a light bearing video information to the elongated prism 28 side. This video information bearing light is transmitted to the outside (lower side) of the prism surface 28, i.e., to an observer side without refraction as much as possible.

In the case of the front-lighting surface light source device, a preferable combination is that an angle formed between the first prism surface 28a and the light output surface 10 is set to 30° to 45°, and an angle formed between the second prism surface 28b and the light output surface 10 is set to 70° to 90°. Another preferable combination is that an angle formed between the first prism surface 28a and the light output surface 10 is set to 30° to 50°, and an angle formed between the second prism surface 28b and the light output surface 10 is set to 20° or lower, preferably 10° or lower.

Also in the case of the front-lighting surface light source device, the tip of the elongated prism 28 can be made flat. In the case of this shape, it is easier to transmit a light reflected by the reflection type liquid crystal display device LC and returned to the elongated prism 28 side. A valley between adjacent elongated prisms 28 can also be made flat.

It is possible to employ a structure where a layer having a refractive index (n5) lower than a refractive index (n3) of the elongated prism 28 is laminated to the outer side of the elongated prism array to fill the concave and convex configurations of the elongated prism array. If this structure is employed, it is possible to prevent damaging of the prism surface by friction or incursion of stains into the concave and convex configurations of the elongated prism array. Especially, in the case of the front-lighting device, because of arrangement thereof in a position nearest the observer, it is very preferable that the concave and convex configurations of the elongated prism array are filled with the layer to be made flat.

Further, also in the case of the front-lighting surface light source device, it is possible to employ a structure where a prism sheet having an elongated prism array of substantially the same shape as that of the concave and convex configurations of the elongated prism 28 and being made of a transparent material of a refractive index substantially the same as that of the light output control function layer 5 in which the array of the elongated prisms 28 is formed is fitted to the outer side of the array of the elongated prisms 28 through a layer of a refractive index (n5) lower than the refractive index (n3) of the light output control function layer 5. Also in the case of this structure, it is possible to prevent damaging of the prism surface by friction or incursion of stains into the concave and convex configuration of the elongated prism array. This structure is ideal as a front-lighting surface light source device because a light reflected by the reflection type liquid crystal display device LC and returned to the elongated prism 28 side is transmitted to the observer side practically without any refraction.

Also in the case of the front-lighting surface light source device, a pitch of the elongated prisms 28 is set as described above.

The surface light source device having the elongated prisms 28 shown in FIG. 9 is excellent as a uniform parallel output light source, and light collimation is high. Thus, by using this feature, it is possible to realize a highly functional, high luminance and uniform surface light source device where an outputted light control member such as a diffraction grating, a polarization conversion element (double refraction sheet or the like), a polarization separation element, a light convergence element such as a lens (cylindrical lens, lenticular lens, prism or anisotropic lens) or the like, is arranged in a side opposite the side of the elongated prism to further control an outputted light.

Regarding the aforementioned surface light source devices having high directional output functions, by using them as a linear light source device, it is possible to obtain a light source having a thin and long light output pattern having a high uniformity ratio and high output efficiency. In this case, by arranging a cylindrical convex lens having a lens surface curved in a direction vertical to a longitudinal direction of the linear light source in the neighborhood of the light output surface of the linear light source device, it is possible to obtain a light source where a spread of an outputted light in the vertical direction is controlled.

Figure 16:
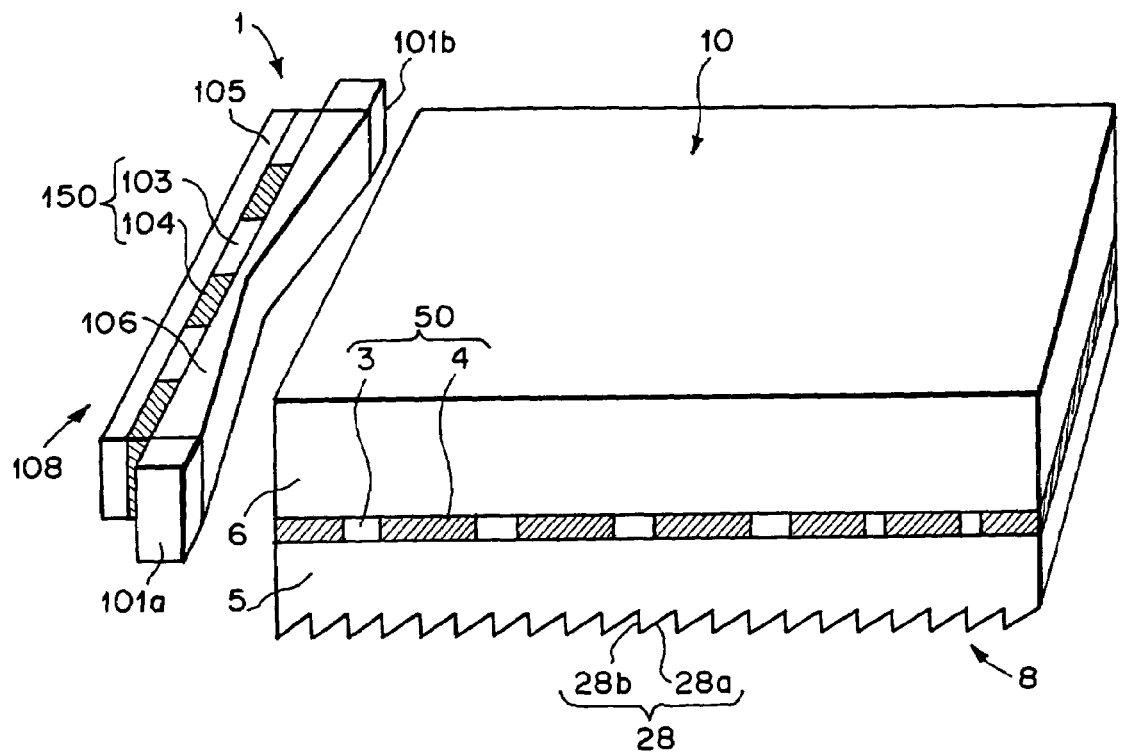
FIG. 16 is a schematic perspective view showing an embodiment of a surface light source device of the present invention.
Figure 17:
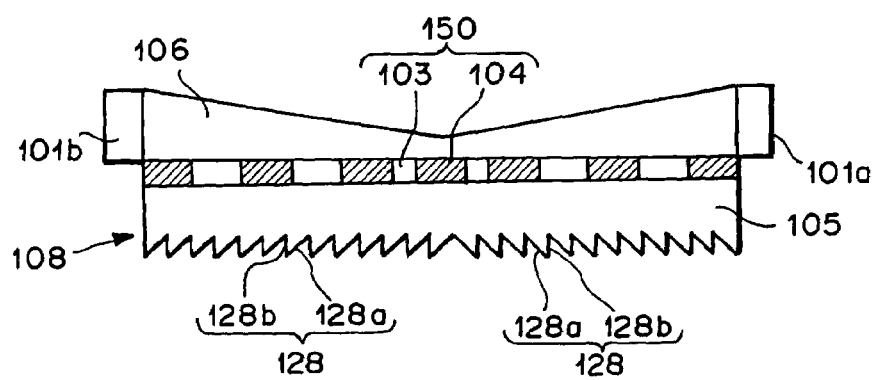
FIG. 17 is a schematic cross-sectional view showing an embodiment of a surface light source device of the present invention.

A surface light source device, for example a surface light source device of the present invention, can be constructed by using the above linear light source device as a primary light source of a surface light source device, and installing it near a light input end face of a light guide. FIG. 16 is a schematic perspective view showing an embodiment of such a surface light source device of the present invention. FIG. 17 is a schematic cross-sectional view of a linear light source device constituting the surface light source device.

In FIG. 16, reference numeral 1 denotes a linear light source device of the present invention constituting a primary light source of the surface light source device. Constitutions of a light guide 6 and a light leakage modulator 8 of the surface light source device are similar to those of FIG. 9. Reference numerals 101a, 101b denote primary light sources of the linear light source device 1, 106 a light guide of the linear light source device, 108 a light leakage modulator of the linear light source device 1, and 103, 104, 105 respectively a low refractive index region, a high refractive index region and a light output control function layer. As the primary light sources 101a, 101b, for example substantially point-shaped light sources such as an LED can be used. The light guide 106 is formed so that a center in a longitudinal direction of the linear light source device 1 is thinnest and both ends are thickest. A light made incident into the light guide from each of the light sources 101a, 101b is guided well to the center of the light guide. The light output control function layer 105 has an array of elongated prisms 128 similar to that of the aforementioned elongated prisms 28. However, with respect to the center in the longitudinal direction of the linear light source device 1 as a boundary, for portions of the elongated prism 128 near the primary light sources 110a, 101b respectively, a first prism surface 128a and a second prism surface 128b are formed in opposite sides to each other.

According to the embodiment, since the linear light source device 1 including the light leakage modulator having the light output control function layer 105 having the array of the elongated prisms 128 is used as the primary light source, a light outputted from the primary light source 1 is converged in a narrow range with respect to the normal direction of the input end face of the light guide 106, and uniformity of luminance is high. By using such a linear light source device 1 as the primary light source, a surface light source device is obtained where a spread of an outputted light distribution is narrow and luminance uniformity is high in the longitudinal direction of the linear light source device. Further, by using the light output control function layer 5 having the array of the elongated prisms 28 as the light leakage modulator 8 of the surface light source, a surface light source device is obtained where a light is emitted in a narrow angle range along the normal direction of the light output surface 10 and a uniformity ratio of luminance in a surface is high. Such a linear light source device having a narrow distribution of the outputted light and high directionality is most suitable especially as a front lighting light source.

As a method for obtaining an improvement effect of a uniformity ratio, there is an example of employing a structure where a light guide thickness, i.e., a dimension in a direction substantially orthogonal to the light output surface of the light guide 106 is reduced as a distance from the primary light sources 101a, 101b is larger. As the structure of reducing the light guide thickness, a monotonous reduction is not necessary, but a thickness reducing portion and a portion of a constant thickness may be combined or a ratio of reduction may be changed.

As the primary light source 1 for the surface light source device of the present invention, in addition to a line light source such as cold-cathode tube or a fluorescent tube, a substantially point-shaped light source such as an LED or a halogen lamp can be used.

Figure 10:
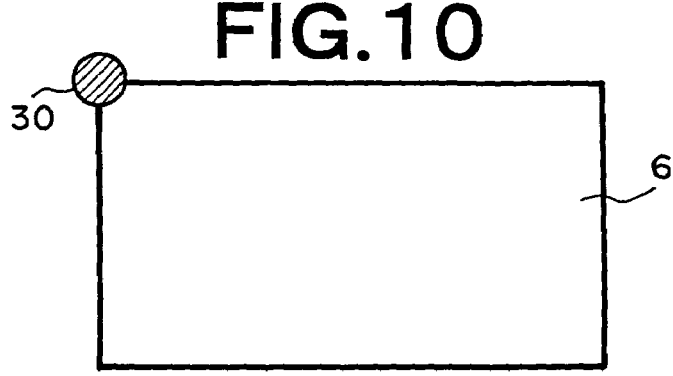
FIG. 10 is a schematic plan view showing a primary light source arrangement seen from a normal direction of a light output surface.
Figure 11:
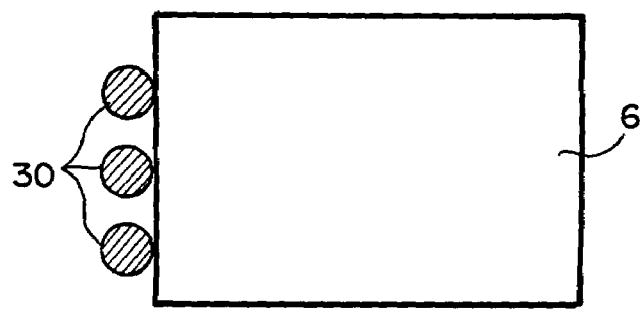
FIG. 11 is a schematic plan view showing a primary light source arrangement seen from a normal direction of a light output surface.
Figure 12:
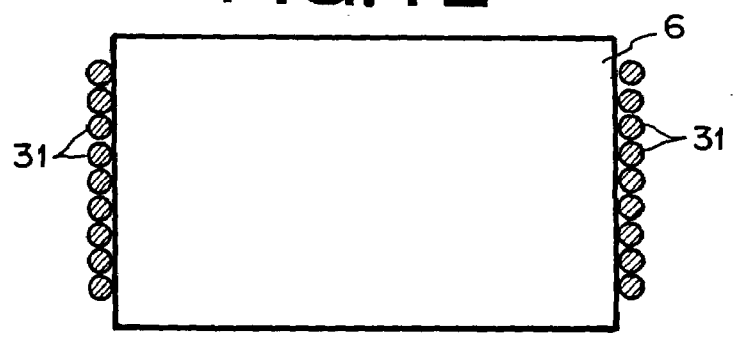
FIG. 12 is a schematic plan view showing a primary light source arrangement seen from a normal direction of a light output surface.

A substantially point-shaped light source 30 can be arranged in a notch formed at a corner of the light guide 6 as shown in FIG. 10. Light sources 30 can also be arrayed adjacently to an end face of the light guide 6 as shown in FIG. 11. Further, the light source 30 can be arranged in the light guide 6. Additionally, as shown in FIG. 12, an LED array 31 can be used where a plurality of LED's as substantially point-shaped light sources are continuously arrayed to form an array element. As the LED light source, a light source of a monochromatic light or a white LED light source having a light of a wavelength of three primary colors of red, green and blue may be used.

In the case of using the point-shaped light source such as an LED for the primary light source 1, preferably, one having an optimal light emission pattern is used in accordance with a need. Preferably, a spread of light emission pattern of the primary light source is set large in a direction parallel to the light output surface of the light guide 6. This is for the purpose of mitigating a phenomenon where luminance before the primary light source becomes higher than in other parts. A peak half value width of the primary light source light emission pattern in the direction parallel to the light output surface of the light guide 6 is preferably set to 120° to 180° if the primary light source is disposed on the end face of the light guide 6. Additionally, if the primary light source is disposed at the corner of the light guide 6, preferably, a peak half value of the primary light source light emission pattern in the direction parallel to the light output surface of the light guide 6 is set so that a spread angle of a light made incident on the light guide approximately coincides with a spread of the light guide, preferably set to 60° to 120° if an angle of the corner of the light guide 6 is 90°, and preferably set to 20° to 70° if an angle of the corner of the light guide 6 is 45°.

If a spread of the primary light source light emission pattern in the direction vertical to the light output surface of the light guide 6 is too large, a ratio of the amount of light emitted from the light guide 6 becomes large in the vicinity of the primary light source to easily reduce luminance uniformity. If it is too small, a ratio of the amount of light going to and coming back in the light guide 6 without being made incident on the light leakage modulator becomes large to easily reduce luminance. A peak half value width of the primary light source light emission pattern in the direction vertical to the light output surface of the light guide 6 is preferably set to 10° to 120°. Preferably, a spread of the primary light source light emission pattern in this direction is narrowed if a size of the surface light source device is large, and set wider if a size of the surface light source device is small. Preferably, the spread is set to 60° to 120° if a size of the surface light source device is 3 inches or lower, and set to 10° to 70° if a size of the surface light source device is larger than 3 inches and up to 8 inches.

For example as shown in FIGS. 16 and 17, in the case of using the linear light source device of the present invention as the primary light source for the surface light source device, since it is not necessary to spread a light emitted from the linear light source device in the direction parallel to the light output surface of the light guide 106, preferably, a spread of a light emission pattern of the linear light source device is set narrow. Specifically, a peak half value width of the light emission pattern of the linear light source device is preferably set equal to/lower than 30°.

Especially, if an LED is used as a primary light source, an angular distribution of a light emitted from the primary light source can be controlled based on a lens shape of the LED.

Figure 13:
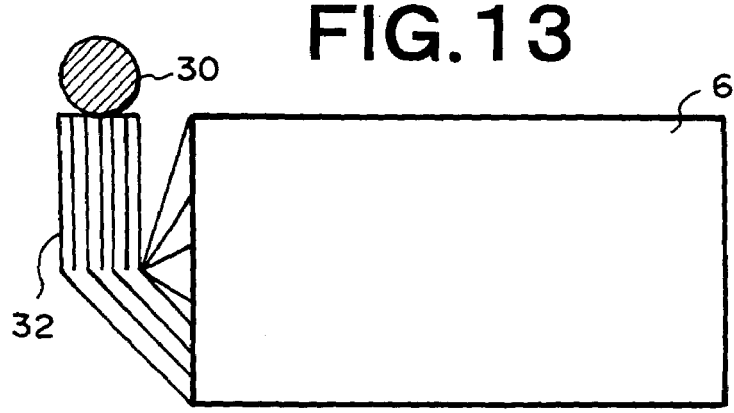
FIG. 13 is a schematic plan view showing a primary light source arrangement seen from a normal direction of a light output surface.

In the device of FIG. 13, the primary light source 1 converts a light from at least one LED 30 into a new light emission source suitable for the input end face of the light guide 6 by using means for dividing the light into light sources each being smaller than LED to change the array of light sources or means for converting a light into a continuous line light source, and then makes the light incident on the substantially plate-like light guide 6. This is very effective means for obtaining a uniform secondary surface light source by using an LED of a small light emission area. Especially, as the means for dividing a light from the LED into light sources to change the array thereof, there is available a method of using an optical fiber array 32 where plastic optical fibers (POF) are arrayed. In this case, while a diameter of the optical fiber depends on a thickness of the light guide 6 used, use of an optical fiber having a smaller diameter is advantageous for realizing an array of more uniform and small divided light sources. Thus, if the optical fiber array 32 is used, the LED 30 can be arranged in a desired position because the optical fiber array is flexible, and a more compact liquid crystal display device can be constructed. There are further advantages, i.e., capability of easily guiding a light to a very thin light guide, reduction in light loss caused by the bending of the optical fiber, etc. Therefore, a preferable diameter of the optical fiber is 1 mm or lower, more preferably 0.5 mm or lower, and further preferably 0.25 mm or lower. However, use of an optical fiber of an excessively small diameter is not advisable because the number of optical fibers to be used is increased and manufacturing becomes complex. Thus, 0.10 mm or higher is preferable for a diameter of an optical fiber.

Figure 23:
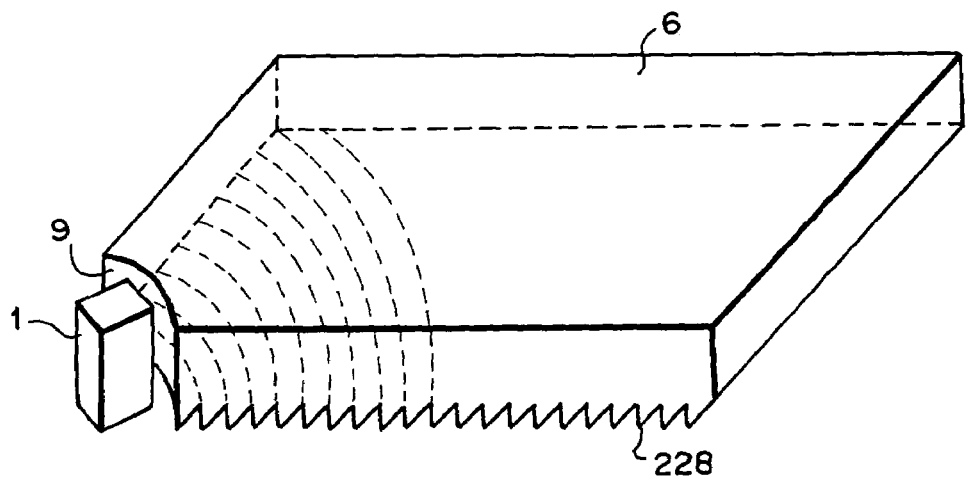
FIG. 23 is a schematic perspective view showing an embodiment of a surface light source device of the present invention.

According to the present invention, in the case of using the point-shaped light source such as an LED as the primary light source 1, as shown in FIG. 23, preferably, an elongated prism 228 constituted of two prism surfaces is formed in the back surface of the light guide 6 so as to be extended in an arc shape such as a circular arc shape, and a number of such elongated prisms 228 are arrayed to surround the point-shaped light source 1. Especially, the elongated prism 228 is preferably formed so as to be extended substantially in perpendicular to a propagation direction (propagation direction in plane along the light output surface) of a light made incident on the light guide 6 from the point-shaped light source 1. Generally, since a light made incident on the light guide 6 from the point-shaped light source such as an LED is propagated in the light guide 6 radially around the point-shaped light source 1 in plane along the light output surface, by forming an elongated prism 228 in a circular arc shape to surround the point-shaped light source, the elongated prism 228 and the propagation direction of the light become substantially vertical to each other on an entire surface of the elongated prism 228. According to the embodiment shown in FIG. 23, the point-shaped light source 1 is arranged at the corner of the light guide 6, and the circular-arc-shaped elongated prism 228 is formed concentrically substantially around the point-shaped light source 1.

Each of circular-arc-shaped elongated prisms 228 concentrically formed is constituted of a prism surface of a side near the point-shaped light source 1 (second prism surface) and a prism surface of a side far from the point-shaped light source 1 (first prism surface). When a light made incident on the light guide 6 is propagated by being repeatedly refracted in the light guide 6, the light reaching the first prism surface is totally reflected on this surface toward the light output surface. In this case, a reflecting direction greatly varies depending on an incident angle of the light onto the first prism surface. According to the present invention, however, since the circular-arc-shaped elongated prism 228 is arranged concentrically substantially around the point-shaped light source 1, the propagation direction of the incident light from the point-shaped light source 1 and the elongated prism 228 become substantially vertical to each other in nearly the entire region of the elongated prism 228, the light is made incident on the first prism surface substantially in a vertical direction in plane along the light output surface, whereby most of lights can be efficiently reflected in a specific direction. As a result, luminance per power consumption can be improved, uniformity of luminance can be improved, and uneven luminance where only a portion before the primary light source becomes bright can be eliminated.

Figure 24:
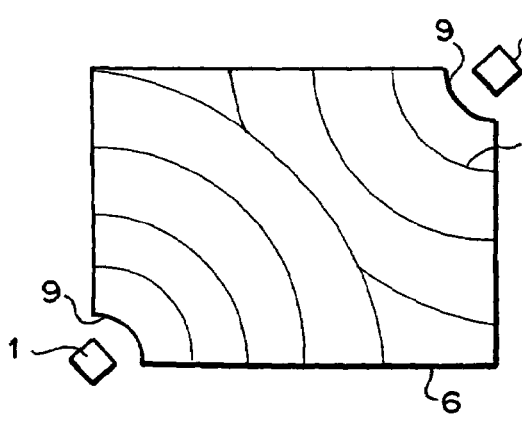
FIG. 24 is a schematic bottom view showing an embodiment of a surface light source device of the present invention.
Figure 25:
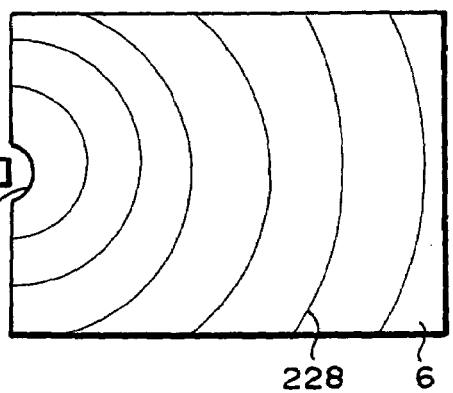
FIG. 25 is a schematic bottom view showing an embodiment of a surface light source device of the present invention.
Figure 26:
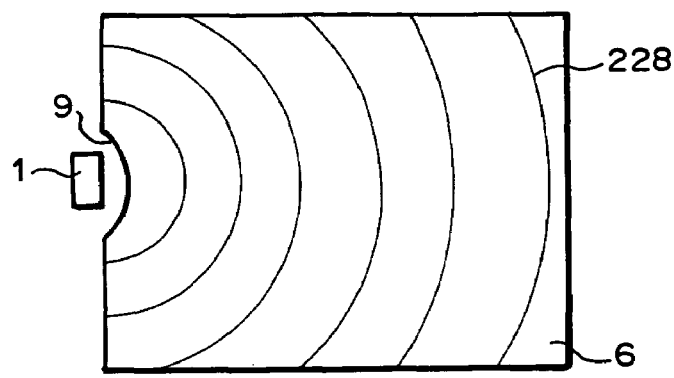
FIG. 26 is a schematic bottom view showing an embodiment of a surface light source device of the present invention.
Figure 27:
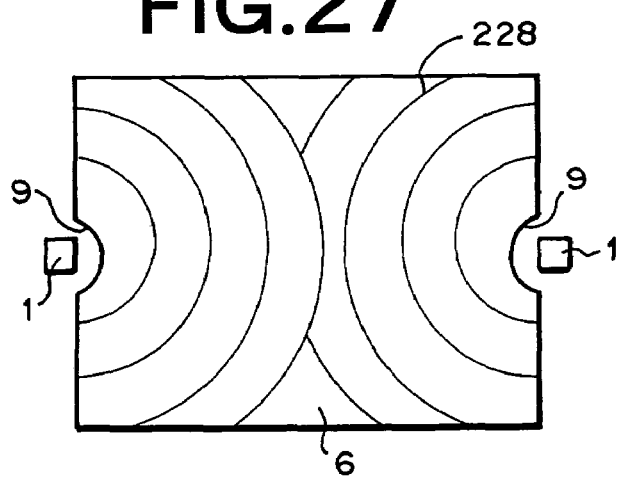
FIG. 27 is a schematic bottom view showing an embodiment of a surface light source device of the present invention.
Figure 28:
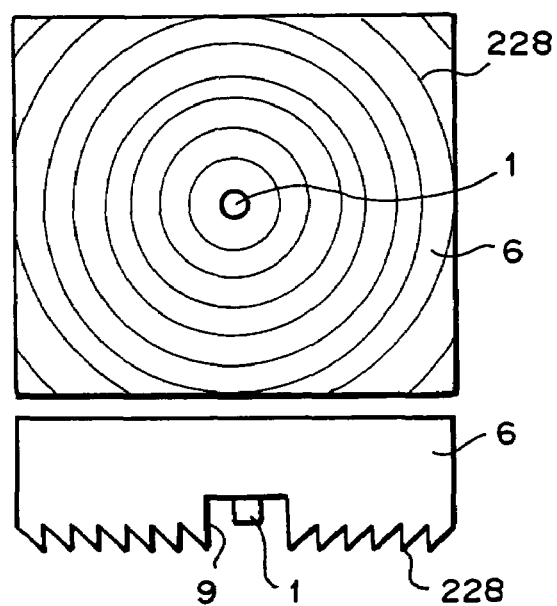
FIG. 28 is a schematic view showing an embodiment of a surface light source device of the present invention.

According to the present invention, as shown in FIGS. 24 to 28, the point-shaped light source 1 can be arranged in an optimal position in accordance with its purpose. The arc-shaped elongated prism 228 formed in the back surface opposite the light output surface of the light guide 6 is also formed by an optimal pattern in accordance with arrangement of the point-shaped light source 1. In each example, the elongated prism 228 is formed by an arc-shaped pattern so that most of lights propagated in the light guide 6 are made incident in a direction substantially perpendicular to the elongated prism 228. FIG. 24 is a schematic view when a plurality of point-shaped light sources 1 are disposed at two corners which are diagonal positions of the light guide 6. Arc-shaped elongated prisms 228 around the respective point-shaped light sources 1 are formed in the respective areas whose boundary is formed by a line where distances from the respective light input surface 9 are equal to each other. FIG. 25 is a schematic view when a point-shaped light source 1 is disposed at a center of one end face of the light guide 6. At the light input surface 9 side, an elongated prism 228 is formed to be circular-arc shape around the point-shaped light source 1. At an end face side opposite the light input surface 9, the elongated prism 228 is formed so as to be a substantially straight line parallel to the end in the center portion of the elongated prism and to be arc shape in the both end portions of the elongated prism. FIG. 26 shows a constitution similar to that of FIG. 25 except for use of an LED collection made by arranging a plurality of LED's to approach one another (e.g., at intervals of 1 to 2 mm) as point-shaped light sources 1. FIG. 27 is a schematic view when two point-shaped light sources 1 are disposed close to the respective centers of two opposite end faces of the light guide 6. Arc-shaped elongated prisms 228 around the respective point-shaped light sources 1 are formed in the respective areas whose boundary is formed by a center line of the light guide 6. FIG. 28 shows an example where a concave portion is formed in a back surface opposite the light output surface of the light guide 6, and a point-shaped light source 1 is arranged therein. In this case, many elongated prisms 228 are formed concentrically around the point-shaped light source 1 around the concave portion receiving the point-shaped light source 1. The point-shaped light source 1 is preferably arranged in the concave portion through an air layer or a transparent material such as a resin.

If the elongated prism is directly formed in the back surface of the light guide 6 as described above, preferably, a light leakage modulator 8 is formed in the light output surface of the light guide 6.

As a material of the light guide 6, a transparent one such as a glass or a synthetic resin can be used in plate-like shape. As the synthetic resin, various highly transparent synthetic resins can be used such as an acrylic resin, a polycarbonate resin, a vinyl chloride resin, a polyolefin resin, polystyrene, or a copolymer of methyl methacrylate (MMA) and styrene (St), etc. A light guide can be manufactured by using a normal molding method such as extrusion or injection molding to mold such a resin in a plate-like shape. Especially, a methacrylate resin such as polymethyl methacrylate (PMMA) is suitable as a light guide material because of high transmittance of rays of light, high resistance to heat, good mechanical properties and good molding performance. Such a methacrylate resin mainly contains methyl methacrylate, and preferably the methyl methacrylate is 80 wt. % or higher. Additionally, light dispersing agents, fine particles or the like may be mixed in the light guide 6.

Including the light guide 6, the low refractive index region 3, the high refractive index 4, the light output control function layer 5 and the additional layer 11 may need relative adjustment of refractive indices. Especially, for the additional layer 11, a material of a refractive index lower than that of the light guide must be used in order to adjust a propagation mode in the light guide. In most cases, for a material constituting a layer of a relatively low refractive index, a glass transition temperature (Tg) is generally equal to/lower than a room temperature. Considering heat resistance, refractive index control etc., preferably, a copolymer of a relatively large Tg is used.

As the material of a relatively low refractive index useful for the present invention, preferably, the material contains a single polymer selected from a monomer group consisting of methyl methacrylate, alkyl fluoride-(meth)acrylate, alkyl fluoride-α-fluoroacrylate, α-fluoroacrylate, pentafluorophenyl methyl methacrylate, pentafluorophenyl-α-fluoroacrylate, and pentafluorophenyl mehtacrylate, and/or a highly transparent copolymer selected from the above monomer group and adjusted for its refractive index. For the low refractive index layer (additional layer) disposed between the light guide and the light leakage modulator, there may be used magnesium fluoride obtained by deposition, which is a low refractive index inorganic material. On the other hand, as the material of a relative high refractive index compared with the material of a relatively low refractive index, a polycarbonate resin, a polyester resin, an acrylic resin, a polyolefin resin etc., are available. By selecting a material of a higher refractive index for the light guide, material selection for the layer of a low refractive index is widened.

As materials of the high refractive index region 4, the light output control function layer 5 and the additional layer 11 regarding the light leakage modulator of the present invention, ultraviolet curable resin compositions can be used. As the ultraviolet curable resin compositions, ones mainly containing a polymerizable compound having an acryloyl group or a methacryloyl group in a molecule, an ultraviolet sensitive radical polymerization initiator and/or an ultraviolet absorbent are available.

As the polymerizable compound having a (meth)acryloyl group in a molecule, there are compounds of photopolymerizable oligomer, multifunctional (meth)acrylate, monofunctional (meth)acrylate etc.

As the photopolymerizable oligomer, there are urethane poly(meth)acrylate oligomer obtained by reacting polyisocyante having two or more isocynate groups in a molecule with a compound having a hydroxyl group and a (meth)acryloyl group in a molecule, epoxy poly(meth)acrylate oligomer obtained by reacting an epoxy compound having two or more epoxy groups in a molecule with a compound having a carboxyl group and a (meth)acryloyl group in a molecule, etc.

Specifically, typical examples thereof include urethane poly(meth)acrylate oligomer obtained by reacting a diisocyanate compound such as isophorone diisocyante, tetramethyl xylylene diisocyanate, xylylene diisocyanate, tolylene diisocyanate or the like with a hydroxyl group containing (meth)acrylate compound such as hydroxyethyl (meth)acrylate, hydroxypropyl (meth)acrylate, tetramethylolmethane tri(meth)acrylate, glycerin di(meth)acrylte or the like, epoxy (meth)acrylate oligomer obtained by reacting an epoxy compound such as bisphenol A diglycidyl ether, bisphenol F diglycydyl ether, bisphenol S diglycidyl ether, tetrabromobisphenol A diglycidyl ether or the like, etc.

Examples of the multifunctional (meth)acrylate compound include ethyleneglycol di(meth)acrylate, diethylene glycol di(meth)acrylate, triethylene glycol di(meth)acrylate, polyethylene glycol di(meth)acrylate, tripropylene glycol di(meth)acrylate, polyrpropylene glycol di(meth)acrylate, polybutylene glycol di(meth)acrylate, 1,3-butylene glycol di(meth)acrylate, 1,6-hexanediol di(meth)acrylate, neopentyl glycol di(meth)acrylate, 2,2-bis[4-(meth)acryloyloxyphenyl]-propane, 2,2-bis[4 -(meth)acryloyloxyethoxyphenyl]-propane, 2,2-bis[4-(meth)acryloyloxydiethoxyphenyl]-propane, 2,2-bis[4-(meth)acryloyloxypentaethoxyphenyl]-propane, 2,2-bis[4-(meth)acrylolyoxyethoxy-3-phenylphenyl]-propane, bis[4-(meth)acryloylthiophenyl] sulfide, bis[4-(meth)acryloyloxyphenyl]-sulfone, bis[4-(meth)acryloyloxyethoxyphenyl]-sulfone, bis[4-(meth)acryloyloxydiethoxyphenyl]-sulfone, bis[4-(meth)acryloyloxypentaethoxyphenyl]-sulfone, bis[4-(meth)acryloyloxyethoxy-3-phenylphenyl]-sulfone, bis[4-(meth)acryloyloxyethoxy-3,5-dimethylphenyl]-sulfone, bis[4-(meth)acryloyloxyphenyl]-sulfide, bis[4-(meth)acryloyloxyethoxyphenyl]-sulfide, bis[4-(meth)acryloyloxypentaethoxyphenyl]-sulfide, bis[4-(meth)acryloyloxyehtoxy-3-phenylphenyl]-sulfide, bis[4-(meth)acryloyloxyethoxy-3,5-dimethylphenyl]-sulfide, 2,2-bis[4-(meth)acryloyloxyethoxy-3,5-dibromophenylpropane], trimethylolpropane tri(meth)acrylate, tetramethylolmethane tri(meth)acrylate, tetramethylolmethane tetra(meth)acrylate and dipentaerythritol hexa(meth)acrylate.

Examples of the monofunctional (meth)acrylate compound include phenyl (meth)acrylate, benzyl (meth)acrylate, phenylethyl (meth)acrylate, phenoxyethyl (meth)acrylate, paracumylphenolethyleneoxide denatured (meth)acrylate, isobornyl (meth)acrylate, cyclohexyl (meth)acrylate, dicyclopentenyl (meth)acrylate, dicyclopentanyl (meth)acrylate, tetrahydrofurfuryl (meth)acrylate, methyl (meth)acrylate, ethyl (meth)acrylate, propyl (meth)acrylate, n-butyl (meth)acrylate, i-butyl (meth)acrylate, t-butyl (meth)acrylate, pentyl (meth)acrylate, 2-ethylhexyl (meth)acrylate, n-hexyl (meth)acrylate, 2-hydroxyethyl (meth)acrylate, 2-hydroxypropyl (meth)acrylate, 2-hydroxybutyl (meth)acrylate, 4-hydroxybutyl (meth)acrylate, tetrahydroxfurfuryl (meth)acrylate, phosphoethyl (meth)acrylate etc.

According to the present invention, the aforementioned compounds may be used singly, or two or more may be mixed for use.

The ultraviolet sensitive radical polymerization initiator used for the present invention is a component which senses ultraviolet rays to generate a radical, and starts polymerization of the aforementioned polymerizable compound. Preferably, the ultraviolet sensitive radical polymerization initiator has light absorption in a wavelength region of 360 to 400 nm, but substantially no absorption in a wavelength region of 400 nm or higher. This is because if it has absorption in the wavelength region of 360 to 400 nm, the ultraviolet sensitive radical polymerization initiator can efficiently generate a radical by absorbing ultraviolet rays not absorbed by the ultraviolet absorbent. It is also because no substantial absorption in the wavelength region of 400 nm or higher enables formation of an uncolored layer. No substantial absorption in the wavelength region of 400 nm or higher means that a concentration of the ultraviolet sensitive radical polymerization initiator and a thickness of the light leakage modulator in actual use, absorption caused by the ultraviolet sensitive radical polymerization initiator is 1% or lower in the wavelength region of 400 n1 or higher. Preferably, the amount of blended ultraviolet sensitive radical polymerization initiator is set in a range of 0.01 to 5 wt. % with respect to 100 wt. % of the aforementioned polymerizable compound, more preferably in a range of 0.1 to 3 wt. %. This is because if the amount of blended ultraviolet sensitive radical polymerization initiator is lower than 0.01 wt. %, curing by ultraviolet irradiation tends to slow down. Conversely, if it exceeds 5 wt. %, a lens portion obtained tends to be easily colored. Typical examples of the ultraviolet sensitive radical polymerization initiator include 3,3-dimethyl-4-methoxybenzophenone, benzyldimethylketal, p-dimetylamino benzoicisoamyl, p-dimethylamino benzoicethyl, benzophenone, p-methoxybenzophenone, 2,2-diethoxyacetophenone, 2,2-dimethoxy-1,2-diphenylethane-1-one, 1-hydroxy cyclohexylphenyl ketone, methyl phenylglyoxylate, ethyl phenylglyoxylate, 2-hydroxy-2-methyl-1-phenylpropane-1-one, 2-methyl-1-[4-(methylthio)phenyl]-2-morpholynopropanone-1 and 2,4,6-trimethylbenzoyldiphenylphosphineoxide. They may be used singly or in a combination of two or more kinds.

According to the present invention, among the above, methyl phenylglyoxylate, 2-hydroxy-2-methyl-1-phenylpropane-1-one, 1-hydroxy cyclohexylphenyl ketone, 2,2-dimethoxy-1,2-dipheylethane-1-one, benzyldimethylketal, 2,4,6-trimethylbenzoylphenylphosphineoxide are particularly preferable in terms of curing performance.

The ultraviolet absorbent used in the present invention is a component for securing adhesion with the light guide for a long time by absorbing ultraviolet rays made incident as external lights to suppress deterioration by the ultraviolet rays.

Further, the ultraviolet curable composition of the present invention may contain various additives such as an antioxidant, a yellowing inhibitor, a bluing agent, a pigment, a sedimentation inhibitor, a defoaming agent, an antistatic agent, a defogging agent etc.

Such an ultraviolet curable composition is suitable for manufacturing an optical sheet where a minute pattern must be formed on a surface of a film-like, a sheet-like or plate-like transparent base member. Example of the optical sheet is a sheet where a layer made of a cured resin obtained by curing the ultraviolet curable composition is formed on at least one surface of the transparent base member. As the tranparent base member, there are no particular limitations as long as it is made of materials through which ultraviolet rays can be transmitted, and a flexible glass plate or the like may be used. Generally, however, a transparent synthetic resin film, sheet or plate made of a acrylic resin, a polycarbonate resin, vinyl chloride resin, a polymethacrylimide resin, a polyester resin or the like is used.

Next, description will be made of a method for manufacturing the surface light source device having the light leakage modulator of the present invention. The light leakage modulator of the present invention can be manufactured by both of a batch production method and a continuous production method. Hereinafter, especially the continuous production method of the surface light source device having the light leakage modulator is described by referring to FIG. 14.

Figure 14:
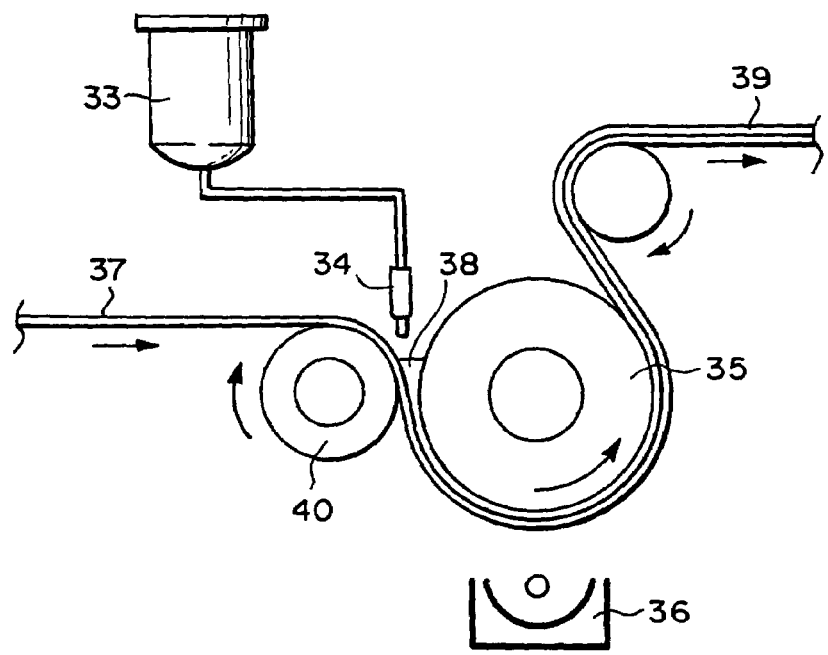
FIG. 14 is a view for explaining continuous manufacturing of a light leakage modulator using a photo-setting resin composition.

In FIG. 14, a reference numeral 36 denotes an ultraviolet ray emission light source, for which a chemical lamp for chemical reaction, a low-pressure mercury lamp, a high-pressure mercury lamp, a metal halide lamp, a visible light halogen lamp, sunlight or the like can be used. Regarding irradiation energy, preferably, ultraviolet ray irradiation is carried out so that integrated energy of a wavelength of 360 to 400 nm can be set to 0.05 to 10 $J/cm^2$. An irradiation atmosphere of ultraviolet rays may be in air or in inert gas such as nitrogen or argon. Reference numeral 35 denotes a shape transfer mold of an optical sheet. As the mold, there may be used a metal mold of aluminum, brass, steel or the like, a synthetic resin mold of a silicone resin, a urethane resin, an epoxy resin, an ABS resin, a fluororesin, a methylpentene resin or the like, or a mold made of one of these materials which are plated or a material in which various metal powders are mixed. Especially, the metal mold is preferable in terms of heat resistance and strength. Structurally, a mold including a corresponding concave pattern for forming a one-side pattern 41 of the light leakage modulator in FIG. 15 (e.g., convex pattern of the high refractive index region 4 as shown) directly in a cylindrical material by transfer, a mold including a thin plate having the concave pattern formed in one side wound around a core roll and fixed, or the like is used.

In FIG. 14, reference numeral 40 denotes a nip roll arranged close to the roll-like (cylindrical) shape transfer mold 35, which makes uniform a film thickness of an ultraviolet curable composition 38 poured between the transparent base member 37 and the mold. For the nip roll 40, various metal rolls, rubber rolls etc., can be used. Reference numeral 33 in the drawing denotes a tank for storing the ultraviolet curable composition. In order to carry out temperature control for the stored composition, a heat source device such as a sheathed heater or a hot water jacket is arranged inside or outside the tank.

The ultraviolet curable composition 38 stored in the tank 33 is supplied through a pipe from a supply nozzle 34 to a portion between the transparent base member 37 and the cylindrical metal mold 35. In a state where the ultraviolet curable composition 38 is retained between the transparent base member 37 and the metal mold 35, and filled in the concave pattern formed in the outer peripheral surface of the cylindrical metal mold 35, ultraviolet rays are irradiated from the ultraviolet ray emission light source 36 through the transparent base member 37 to polymerize and cure the ultraviolet curable composition 38, and the convex pattern 41 of one side of the light leakage modulator is transferred. Then, an obtained optical sheet 39 is peeled off from the cylindrical mold 35.

Figure 15:
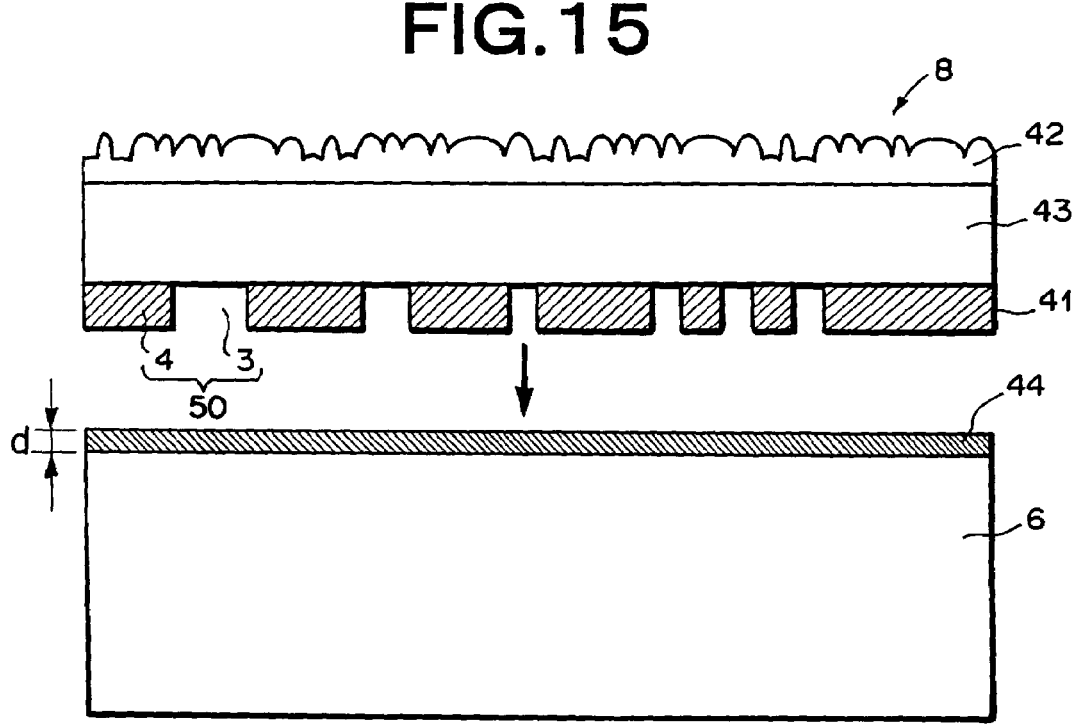
FIG. 15 is a schematic cross-sectional view showing manufacturing of a surface light source device by bonding a light leakage modulator using a photo-setting resin composition and a light guide.

For example, to obtain the light leakage modulator structure of FIG. 15, a concave and convex structure of the pattern 41 may be formed in a transparent base member 43 (transparent base member 37) by the aforementioned method, and then a function layer (e.g., light diffusion function layer having a mat finished structure on the surface) 42 may be formed on a surface of the transparent base member 43 opposite the pattern 41 also by the same method using a transfer roll metal mold having a mat finished structure transfer surface. Accordingly, it is possible to continuously manufacture the light leakage modulator 8 including functional structures in both surfaces.

In FIG. 15, the light output control function layer 5 is made of the transparent base member 43, and the function layer 42 is attached onto the light output control function layer 5.

As shown in FIG. 15, in the case of manufacturing the surface light source device by integrating the sheet of the light leakage modulator 8 manufactured in the foregoing manner with the light guide 6, a method for thinly applying an adhesive on the light output surface of the light guide 6 and bonding the high refractive index region 4 of the light leakage modulator through an adhesive layer 44 is employed. A thickness d of the adhesive layer 44 is preferably set smaller than, for example, a thickness H1 of the low refractive index region (air layer) 3 so as to prevent a loss of a target function caused by influence given to the concave and convex structure of the light leakage modulator 8 by great deformation and fluidization of the adhesive due to adhesive pressure. Ratio d/H1 is preferably in a range of 0.5 or lower, more preferably 0.2 or lower, most preferably 0.1 or lower. For example, if a value of H1 is 50 µm, d is most preferably set to 5 µm or lower. However, since a sufficient adhesive function may not be obtained if the adhesive layer 44 is too thin, a thickness of the adhesive layer 44 is preferably set to 2 µm or higher, more preferably 4 µm or higher. There is also a method of using a photo-setting resin composition for the adhesive layer 44. A method for thinly applying a photo-setting resin composition similar to the above on the light guide 6, tightly fixing the sheet of the light leakage modulator as in the aforementioned case, and then curing the composition for integration by ultraviolet irradiation can also be used. By using a material of a low refractive index for the adhesive layer 44, a function as the low refractive index layer (additional layer) 22 shown in FIGS. 6 and 7 can be simultaneously imparted.

By the foregoing manufacturing method, it is possible to continuously and easily manufacture the surface light source device integrating the light guide 6 and the light leakage modulator 8. Moreover, a device including the entire structure or the partial structure (e.g., concave and convex structure or prism structure of the light output control function layer 5) of the light leakage modulator 8 can be manufactured by an injection compressing method, and combined with the light guide 6.

Next, the present invention will be specifically described by way of examples.

EXAMPLE 1

By the manufacturing method described above with reference to FIGS. 14 and 15, a surface light source device comprising a light leakage modulator having a light diffusion function was manufactured. A mat finished structure was employed for a light diffusion function layer 42 and, regarding a metal mold for transferring the mat finished structure, glass beads having a diameter of 50 to 90 µm were blasted to a SUS plate to form a concave and convex configuration. Then, the mold was wound around a roll to form a roll mold. On the other hand, a circular form similar to that shown in FIG. 4 was employed for a low refractive index region 3 of a composite layer 50 for controlling a light leakage distribution from a light guide 6 to the layer 42 of the mat finished surface, and an air layer (refractive index of 1.000) was employed for the low refractive index region 3. However, a diameter of each circular low refractive index region 3 was set to 60 µm, and a light leakage intensity distribution was controlled by changing its occupation density in the composite layer 50. A thickness of the composite layer 50 was about 50 µm. The composite layer 50 was also formed by using an ultraviolet curable resin composition and a transfer mold, in which case the transfer mold was prepared by etching a SUS plate of a thickness 50 µm to form many circular (corresponding to the shape of the low refractive index region 3) convex portions of 50 µm in diameter. The mold thus obtained by etching was lastly wound around and fixed on a roll to make a roll mold, and this mold was put to use.

Double-surface formation of the function layer 42 of the mat finished structure and the composite layer 50 of light leakage control was made by transferring surface configurations of the molds to both surfaces of a polyester film (refractive index of 1.600) of a thickness 188 µm using an ultraviolet curable resin composition of a refractive index 1.528. A high-pressure mercury lamp was used for a UV light source 36. Polymethylmethacrylate (PMMA) of a refractive index 1.490 was used for a material of the light guide 6.

The light leakage modulator sheet 8 manufactured in the aforementioned manner was fixed to the wedge-shaped light guide 6 having a wedge angle of 0.34° by applying an adhesive to about 8 µm thickness to be integrated. A thickness of the wedge-shaped light guide 6 in a light input end face portion of a primary light source side was 2 mm, and a thickness in an end face portion of an opposite side was 0.7 mm. For the primary light source, a cold-cathode tube of a diameter 2 mmφ was used, and a length of the light guide 6 was 216 mm. A reflecting plate 7 was arranged on an entire back surface opposite a light output surface of the light guide 6. Further, in a light output surface side of the light leakage modulator 8, a prism sheet 52 in which many elongated prisms each having two prism surfaces symmetrically arranged at an apex angle of 63° were arranged in parallel to each other was disposed adjacently to the light leakage modulator so as to bring an apex of the elongated prism into contact with the light output surface. As a result, the target surface light source device was completed.

To check on a uniformity ratio of the surface light source device, a front luminance distribution of an outputted light was measured. A ratio of a minimum luminance value/ maximum luminance value regarding in-plane luminance was very high, i.e., 90%, and an average outputted light luminance was 2500 cd/m². An outputted light luminance distribution (output angle distribution) of the surface light source device was measured. A width of output angles (angular half value width) having luminance value of half the front luminance was about 28° in a direction vertical to the light input surface of the light guide, and thus narrow visual field characteristics were exhibited. The luminance measurement was carried out at a light reception angle of 1° by using a color luminance meter BM-7 (manufactured by TOPCON INC.).

EXAMPLE 2

A light leakage modulator was manufactured by using a roll transfer mold to perform UV-curing of ultraviolet curable resin compositions on both surfaces of a polyester film based on the same method as that of the example 1, and a surface light source device having an elongated prism 28 similar to that shown in FIG. 9 was manufactured. That is, in place of the mat finished structure function layer 42 of the example 1, a function layer was used including continuous elongated prisms, where many elongated prisms 28 each having first and second prism surfaces 28a, 28b extending in a direction substantially parallel to a light input surface of a light guide were continuously arrayed in a direction substantially orthogonal to the light input surface of the light guide. An inclination angle of the first prism surface 28a of the elongated prism 28 was 45°, and that of the second elongated prism was 85°. For a size of the surface light source, a length in a direction along a first primary light source 1 was 80 mm, a length in a direction orthogonal to the primary light source was 60 mm, and a thickness was 4 mm. For the first primary light source 1, a cold-cathode tube having a length of 80 mm was used. A reflecting plate 7 was arranged on an entire back surface opposite the light output surface of the light guide 6. Thus, the target surface light source was obtained.

An outputted light luminance distribution (output angle distribution) of the surface light source device was measured. A width of output angles (angular half value width) having luminance value of half the front luminance was about 19° in a direction vertical to the light input surface of the light guide, and thus narrow visual field characteristics were exhibited. Moreover, a ratio of a minimum luminance value/maximum luminance value regarding in-plane luminance was 88%, exhibiting a very high uniformity ratio.

EXAMPLE 3

A surface light source device having narrow visual field characteristics similar to those of the example 2 was manufactured. However, a length of the surface light source device in a direction along a primary light source 1 was 30 mm, a length in a direction orthogonal to the primary light source was 40 mm, and a thickness was 1 mm. Six LED's were used in place of the cold-cathode tube for the light guide of the example 2, and these were arranged adjacently to a light input end surface of a light guide equally at intervals of 5 mm.

An outputted light luminance distribution (output angle distribution) of the surface light source device was measured. A width of output angles (angular half value width) having luminance value of half the front luminance was about 23° in a direction vertical to the light input surface of the light guide, and thus narrow visual field characteristics were exhibited. Moreover, a ratio of a minimum luminance value/maximum luminance value regarding in-plane luminance was 80%, exhibiting a very high uniformity ratio.

EXAMPLE 4

A surface light source device similar to that of the example 3 (however, excluding primary light source) was manufactured. This surface light source device was cut out to be 2 mm in width in a surface orthogonal to a elongated prism 28, and LED's were arranged adjacently at both ends thereof. For the LED's, peak half values of light emission patterns in directions parallel and vertical to a light output surface of a light guide were both 30°.

The linear light source device thus obtained was arranged in place of the primary light source of the surface light source device of the example 3.

An outputted light luminance distribution (output angle distribution) of the surface light source device was measured. A width of output angles (angular half value width) having luminance value of half the front luminance was about 22° in a direction vertical to the light input surface of the light guide, and thus narrow visual field characteristics were exhibited. Moreover, a ratio of a minimum luminance value/maximum luminance value regarding in-plane luminance was 85%, exhibiting a very high uniformity ratio.

EXAMPLE 5

A light leakage modulator sheet was manufactured similarly to the example 1 except for the fact that a pattern of a low refractive index region 3 was set to the pattern shown in FIG. 19, and an elongated prism pattern was formed in place of the light diffusion function layer of the mat finished structure. The formation of the elongated prism pattern of the light leakage modulator sheet was carried out by using a mold where elongated prisms each having a pattern similar to that shown in FIG. 23 for the light guide, an angle 88° made by a second prism surface with a prism formed surface and an angle 43° made by a first prism surface with a prism formed surface, were formed at a pitch 20 μm.

The obtained light leakage modulator was fixed to a surface (back surface) opposite a light output surface of a plate-like light guide having a thickness of 1 mm and a size 40 mm×30 mm which was formed by injection-molding a polymethylmethacrylate of a refractive index 1.490 by applying an adhesive to about 8 μm thickness to be integrated. For a primary light source, an LED having a peak half value width ±70° in a direction parallel to the light output surface of the light guide and a peak half value width ±40° in a vertical direction was arranged at a corner of the light guide where a concave portion was formed. Additionally, a reflecting plate was arranged on the light leakage modulator formation surface side of the light guide. As a result, the surface light source device was completed.

To check on a uniformity ratio of the surface light source, a front luminance distribution of an outputted light was measured. A ratio of a minimum luminance value/maximum luminance value regarding in-plane luminance was high, i.e., 85%. An outputted light luminance distribution (output angle distribution) of the surface light source device was measured. A width of output angles (angular half value width) having luminance value of half the front luminance was about 22° in a direction vertical to the light input surface of the light guide, and thus narrow visual field characteristics were exhibited. The luminance measurement was carried out at a light reception angle of 1° by using a color luminance meter BM-7 (manufactured by TOPCON INC.).

EXAMPLE 6

A light leakage modulator sheet was manufactured similarly to the example 1 except for the fact that a pattern of a low refractive index region 3 was set to the pattern shown in FIG. 19.

On the other hand, a mold was manufactured where elongated prisms each having a pattern similar to that shown in FIG. 23, an angle 88° made by a second prism surface with a prism formed surface and an angle 43° made by a first prism surface with a prism formed surface were formed at a pitch 20 µm. By using the obtained mold, a plate-like light guide having a thickness of 1 mm and a size of 40 mm×30 mm similar to that shown in FIG. 23 was obtained by injection-molding a polymethylmethacrylate of a refractive index 1.490. The light leakage modulator was fixed to a surface (light output surface) opposite an elongated prism formed surface of the light guide by applying an adhesive to about 8 µm thickness to be integrated. For a primary light source, an LED having a peak half value width ±70° in a direction parallel to the light output surface of the light guide and a peak half value width ±40° in a vertical direction was arranged at a corner of the light guide where a concave portion was formed. Additionally, a reflecting plate was arranged on the prism formed surface side of the light guide, and thus the surface light source device was completed.

To check on a uniformity ratio of the surface light source, a front luminance distribution of an outputted light was measured. A ratio of a minimum luminance value/maximum luminance value regarding in-plane luminance was high, i.e., 85%. An outputted light luminance distribution (output angle distribution) of the surface light source device was measured. A width of output angles (angular half value width) having luminance value of half the front luminance was about 22° in a direction vertical to the light input surface of the light guide, and thus narrow visual field characteristics were exhibited. The luminance measurement was carried out at a light reception angle of 10 by using a color luminance meter BM-7 (manufactured by TOPCON INC.).

EXAMPLE 7

A front-lighting surface light source device was completed similarly to the example 6 except for the fact that an apex of each elongated prism formed in a back surface of a light guide was formed to be flat and no reflecting plate was arranged.

To check on a uniformity ratio of the surface light source, a front luminance distribution of an outputted light was measured. A ratio of a minimum luminance value/maximum luminance value regarding in-plane luminance was high, i.e., 85%. An outputted light luminance distribution (output angle distribution) of the surface light source device was measured. A width of output angles (angular half value width) having luminance value of half the front luminance was about 22° in a direction vertical to the light input surface of the light guide, and thus narrow visual field characteristics were exhibited. The luminance measurement was carried out at a light reception angle of 1° by using a color luminance meter BM-7 (manufactured by TOPCON INC.).

EXAMPLE 8

A light leakage modulator sheet was obtained similarly to the example 5 except for use of an ultraviolet curable resin composition having a refractive index of 1.610. On the other hand, a prism sheet was obtained by forming an elongated prism pattern similar to that formed in the light leakage modulator sheet on one surface of a polyester film (refractive index of 1.600) having a thickness of 188 µm using an ultraviolet curable resin composition having a refractive index of 1.610 similarly to the example 5. The light leakage modulator sheet and the prism sheet thus obtained were fixed together to be integrated through an adhesive acrylic resin applied layer having a refractive index of 1.40 so as to fit both elongated prism pattern formation surfaces to each other. As a result, a light leakage modulator sheet was manufactured.

The obtained light leakage modulator sheet was fixed to a plate-like light guide having a thickness of 1 mm and a size 40 mm×30 mm made by injection-molding a polymethylmethacrylate resin of a refractive index 1.490 to be integrated similarly to the example 5. The front-lighting surface light source device was completed similarly to the example 5 except for non-arrangement of any reflecting plate.

To check on a uniformity ratio of the surface light source, a front luminance distribution of an outputted light was measured. A ratio of a minimum luminance value/maximum luminance value regarding in-plane luminance was high, i.e., 90%. An outputted light luminance distribution (output angle distribution) of the surface light source device was measured. A width of output angles (angular half value width) having luminance value of half the front luminance was about 22° in a direction vertical to the light input surface of the light guide, and thus narrow visual field characteristics were exhibited. The luminance measurement was carried out at a light reception angle of 1° by using a color luminance meter BM-7 (manufactured by TOPCON INC.).

Industrial Applicability

As described above, according to the present invention, there is provided a light source device such as a functional surface light source device or a functional linear light source device, which has a high in-plane uniformity ratio of outputted light luminance without losing its functionality even if it is relatively thin and large in area and/or has a light guide including the special functionality regarding the outputted light control function. Especially, it is possible to provide the light source device such as a surface light source device or a linear light source device which can impart a high uniformity ratio with good reproducibility easily without losing the functionality of the high luminance directional light output function or the like.

What is claimed is:
1. A light source device comprising:
 a primary light source;
 a light guide constituting a waveguide for transmitting a light outputted from the primary light source, having a refractive index of ng, and including a light input end face on which a light emitted from the primary light source is made incident, a light output surface for outputting a transmitted light, and a back surface positioned in a side opposite the light output surface; and
 a light leakage modulator attached to at least one of the light output surface and the back surface of the light guide, and including a composite layer positioned on the light output surface or the back surface and having a plurality of first refractive index regions each having a refractive index of n1 (here, ng>n1) and a plurality of second refractive index regions each having a refractive index of n2 (here, n2>n1), and a third refractive index layer positioned on the composite layer and having a refractive index of n3 (here, n3>n1).

2. The light source device according to claim 1, wherein a fourth refractive index layer having a refractive index of n4 (here, ng>n4>n1) is disposed between the light guide and the light leakage modulator.

3. The light source device according to claim 1, wherein a density of the second refractive index regions indicated by an area occupied by the second refractive index regions per unit area of the composite layer is changed from place to place in a surface of the composite layer.

4. The light source device according to claim 1, wherein an average thickness Hi of the first refractive index regions and an average minimum dimension W2 in an in-plane direction of the second refractive index regions satisfy a relationship of $$1 \leq (W2/H1) \leq 30.$$

5. The light source device according to claim 1, wherein n2<ng is set.

6. The light source device according to claim 1, wherein the third refractive index layer or the composite layer has a light control function, and the light control function is at least one of a directional light output function or a light diffusion function.

7. The light source device according to claim 6, wherein in the third refractive index layer of the light leakage modulator attached to the back surface of the light guide or in a member arranged on the third refractive index layer, a directional light output function unit is formed by arraying many elongated prisms each including two prism surfaces in a direction substantially vertical to a propagation direction of a light in the light guide in parallel with one another.

8. The light source device according to claim 7, wherein inclination of a prism surface of the elongated prisms near the primary light source is 80 to 100° with respect to the light output surface, and inclination of a prism surface far from the primary light source is 35 to 55° with respect to the light output surface.

9. The light source device according to claim 7, wherein a layer having a refractive index smaller than a refractive index of a layer or a member in which the directional light output function unit is formed is laminated to fill concave and convex configuration of an elongated prism array of the directional light output function unit.

10. The light source device according to claim 7, wherein onto the directional light output function unit, a prism sheet having an elongated prism array corresponding to an elongated prism array of the directional light output function unit in one side and being made of a material of a refractive index substantially equal to that of a layer or a member in which the directional light output function unit is formed, is fitted through a layer having a refractive index smaller than that of the layer or the member in which the directional light output function unit is formed so that the elongated prism arrays correspond to each other.

11. The light source device according to claim 10, wherein the layer having the refractive index smaller than that of the layer or the member in which the directional light output function unit is formed is an air layer.

12. The light source device according to claim 1, wherein the primary light source is a substantially point-shaped light source.

13. The light source device according to claim 12, wherein the primary light source is constituted of an LED.

14. The light source device according to claim 13, wherein the primary light source is a collection of LED's.

15. The light source device according to claim 13, wherein a peak half value width of an emission pattern of the LED is 10 to 120° in a direction vertical to the light output surface of the light guide, and 80 to 180° in a direction parallel to the light output surface of the light guide.

16. The light source device according to claim 1, wherein the primary light source uses means for dividing a light from at least one of the LED's to form a smaller division light sources and aligning the division light sources and/or means for converting a light from at least one of the LED's into a continuous linear light source.

17. The light source device according to claim 1, wherein the primary light source is at least one point-shaped light source and, in the back surface of the light guide, a directional light output function unit is formed in which many arc-shaped elongated prisms each including two prism surfaces are arrayed in parallel with one another to surround the primary light source.

18. The light source device according to claim 17, wherein inclination of a prism surface of the elongated prisms near the primary light source is 80 to 100° with respect to the light output surface, and inclination of a prism surface far from the primary light source is 35 to 55° with respect to the light output surface.

19. The light source device according to claim 17, wherein a layer having a refractive index smaller than a refractive index of a layer or a member in which the directional light output function unit is formed is laminated to fill concave and convex configuration of an elongated prism array of the directional light output function unit.

20. The light source device according to claim 17, wherein onto the directional light output function unit, a prism sheet having an elongated prism array corresponding to an elongated prism array of the directional light output function unit in one side and being made of a material of a refractive index substantially equal to that of a layer or a member in which the directional light output function unit is formed, is fitted through a layer having a refractive index smaller than that of the layer or the member in which the directional light output function unit is formed so that the elongated prism arrays correspond to each other.

21. The light source device according to claim 20, wherein the layer having the refractive index smaller than that of the layer or the member in which the directional light output function unit is formed is an air layer.

22. The light source device according to claim 17, wherein the point-shaped light source is arranged in a concave portion formed in the back surface opposite the light output surface of the light guide.

23. The light source device according to claim 17, wherein the point-shaped light source is constituted of an LED.

24. The light source device according to claim 23, wherein the point-shaped light source is a collection of LED's.

25. The light source device according to claim 23, wherein a peak half value width of an emission pattern of the T,F,D is 10 to 120° in a direction vertical to the light output surface of the light guide, and 80 to 180° in a direction parallel to the light output surface of the light guide.

26. A surface light source device of an edge lighting system including as a primary light source a linear light source device of claim 6, which extends in a direction orthogonal to the light input end face.

27. The light source device according to claim 1, wherein the device is a front lighting light source device to be arranged in an observation side with respect to an object illuminated by a light emitted from the light source device, and the light source device is transparent so as to transmit at least a part of the light from the object illuminated by the light source device to the observation side.

28. A surface light source device comprising:
  at least one point-shaped light source;
  a rectangular light guide having a light input surface on which a light from the point-shaped light source is made incident and a light output surface for outputting an inputted light; and
  a directional light output function unit formed in a back surface of the light guide opposite the light output surface by arraying many arc-shaped elongated prisms each including two prism surfaces to surround the point-shaped light source in parallel with one another.

29. The surface light source device according to claim 28, wherein inclination of a prism surface of the elongated prisms near the point-shaped light source is 80 to 100° with respect to the light output surface, and inclination of a prism surface far from the point shaped light source is 35 to 55° with respect to the light output surface.

30. The surface light source device according to claim 28, wherein, a layer having a refractive index smaller than a refractive index of a layer or a member in which the directional light output function unit is formed is laminated to fill concave and convex configuration of an elongated prism array of the directional light output function unit.

31. The surface light source device according to claim 28, wherein onto the directional light output function unit, a prism sheet having an elongated prism array corresponding to an elongated prism array of the directional light output function unit in one side and being made of a material of a refractive index substantially equal to that of a layer or a member in which the directional light output function unit is formed, is fitted through a layer having a refractive index smaller than that of the layer or the member in which the directional light output function unit is formed so that the elongated prism arrays correspond to each other.

32. The surface light source device according to claim 28, wherein the layer having the refractive index smaller than that of the layer or the member in which the directional light output function unit is formed is an air layer.

33. The surface light source device according to claim 28, wherein the point-shaped light source is arranged in a concave portion formed in the back surface opposite the light output surface of the light guide.

34. The surface light source device according to claim 28, wherein the point-shaped light source is constituted of an LED.

35. The surface light source device according to claim 34, wherein the point-shaped light source is a collection of LED's.

36. The surface light source device according to claim 34, wherein a peak half value width of an emission pattern of the LED is 10 to 120° in a direction vertical to the light output surface of the light guide, and 80 to 180° in a direction parallel to the light output surface of the light guide.

* * * * *